(12) United States Patent
Connor et al.

(10) Patent No.: US 6,406,523 B1
(45) Date of Patent: Jun. 18, 2002

(54) ROTARY PRESSURE SWING ADSORPTION APPARATUS

(75) Inventors: Denis J. Connor, Vancouver; David G. Doman, Delta; Les Jeziorowski, Coquitlam; Bowie G. Keefer, Vancouver; Belinda Larisch, Vancouver; Christopher McLean, Vancouver; Ian Shaw, Richmond, all of (CA)

(73) Assignee: QuestAir Technologies, Inc., Burnaby (CA)

( * ) Notice: Subject to any disclaimer, the term of this patent is extended or adjusted under 35 U.S.C. 154(b) by 9 days.

(21) Appl. No.: 09/591,275

(22) Filed: Jun. 9, 2000

(51) Int. Cl.[7] .............................................. B01D 53/06
(52) U.S. Cl. ............................ 96/125; 96/130; 96/150; 96/154
(58) Field of Search .......................... 96/123, 125, 130, 96/135, 142, 150, 153, 154

(56) References Cited

U.S. PATENT DOCUMENTS

| | | | |
|---|---|---|---|
| 3,176,446 A | 4/1965 | Siggelin | 55/189 |
| 3,713,281 A * | 1/1973 | Asker et al. | 96/154 |
| 4,093,435 A * | 6/1978 | Marron et al. | 96/125 |
| 4,290,789 A * | 9/1981 | Newton | 96/125 X |
| 4,354,859 A | 10/1982 | Keller et al. | |
| 4,452,612 A | 6/1984 | Mattia | 55/25 |
| 4,530,705 A | 7/1985 | Firey | 55/162 |
| 4,702,903 A | 10/1987 | Keefer | |
| 4,758,253 A | 7/1988 | Davidson et al. | 55/77 |
| 4,781,735 A | 11/1988 | Tagawa | |
| 4,801,308 A | 1/1989 | Keefer | |
| 4,816,121 A | 3/1989 | Keefer | |
| 4,946,479 A * | 8/1990 | Izumo | 96/123 |
| 4,968,329 A | 11/1990 | Keefer | 55/25 |
| 4,969,935 A | 11/1990 | Hay | |
| 5,017,202 A * | 5/1991 | Ogata et al. | 96/125 |
| 5,057,128 A * | 10/1991 | Panzica et al. | 96/123 |
| 5,082,473 A | 1/1992 | Keefer | 55/25 |
| 5,133,784 A | 7/1992 | Boudet et al. | 55/25 |
| 5,246,676 A | 9/1993 | Hay | |
| 5,248,325 A | 9/1993 | Kagimoto et al. | 96/124 |
| 5,256,172 A | 10/1993 | Keefer | 423/230 |
| 5,328,503 A | 7/1994 | Kumar | |
| 5,393,326 A | 2/1995 | Engler | |
| 5,411,578 A | 5/1995 | Watson | |
| 5,431,716 A * | 7/1995 | Ebbeson | 96/125 |
| 5,441,559 A | 8/1995 | Petit et al. | 96/125 |

(List continued on next page.)

FOREIGN PATENT DOCUMENTS

| | | |
|---|---|---|
| CA | 1256038 | 6/1989 |
| CA | 2016045 | 8/1994 |
| CA | 2109055 | 2/1999 |
| CA | 2087972 | 1/2000 |
| CA | 2087973 | 1/2001 |
| EP | 0 143 537 | 3/1990 |
| EP | 0 681 860 A2 | 7/1996 |
| WO | WO 94/04249 | 3/1994 |

Primary Examiner—Robert H. Spitzer
(74) Attorney, Agent, or Firm—Klarquist Sparkman LLP

(57) ABSTRACT

Gas separation by pressure swing adsorption (PSA) is performed within an apparatus having a plurality of adsorbers cooperating with first and second valves in a rotary PSA module, with the PSA cycle characterized by multiple intermediate pressure levels between the higher and lower pressures of the PSA cycle. Gas flows enter or exit the PSA module at the intermediate pressure levels as well as the higher and lower pressure levels, under substantially steady conditions of flow and pressure. The PSA module comprises a rotor containing laminated sheet adsorbers and rotating within a stator, with ported valve faces between the rotor and stator to control the timing of the flows entering or exiting the adsorbers in the rotor.

92 Claims, 25 Drawing Sheets

U.S. PATENT DOCUMENTS

| | | |
|---|---|---|
| 5,487,775 A | 1/1996 | LaCava et al. ............... 95/98 |
| 5,523,326 A | 6/1996 | Dandekar et al. |
| 5,656,067 A | 8/1997 | Watson et al. ............... 95/101 |
| 5,658,370 A | 8/1997 | Vigor et al. |
| 5,711,926 A | 1/1998 | Knaebel |
| 5,878,590 A * | 3/1999 | Kadle et al. ............... 96/125 X |
| 5,917,136 A | 6/1999 | Gaffney et al. |
| 6,051,050 A * | 4/2000 | Keefer et al. ............... 96/125 X |
| 6,056,804 A | 5/2000 | Keefer et al. |
| 6,063,161 A | 5/2000 | Keefer et al. |
| 6,176,897 B1 | 1/2001 | Keefer |

* cited by examiner

ROTARY PRESSURE SWING ADSORPTION APPARATUS

FIELD OF THE INVENTION

The invention relates to gas separations conducted by pressure swing adsorption, and in particular applications to oxygen or nitrogen separation from air and to hydrogen purification. A particular application is for oxygen enrichment to mobile fuel cell power plants, for which efficient and compact machinery will be required.

BACKGROUND OF THE INVENTION

Gas separation by pressure swing adsorption (PSA) is achieved by coordinated pressure cycling and flow reversals over an adsorbent bed which preferentially adsorbs a more readily adsorbed component relative to a less readily adsorbed component of the mixture. The total pressure is elevated during intervals of flow in a first direction through the adsorbent bed from a first end to a second end of the bed, and is reduced during intervals of flow in the reverse direction. As the cycle is repeated, the less readily adsorbed component is concentrated in the first direction, while the more readily adsorbed component is concentrated in the reverse direction.

A "light" product, depleted in the more readily adsorbed component and enriched in the less readily adsorbed component, is then delivered from the second end of the bed. A "heavy" product enriched in the more strongly adsorbed component is exhausted from the first end of the bed. The light product is usually the desired product to be purified by PSA, and the heavy product often a waste product, as in the important examples of oxygen separation over nitrogen-selective zeolite adsorbents and hydrogen purification. The heavy product is a desired product in the example of nitrogen separation over nitrogen-selective zeolite adsorbents. Typically, the feed is admitted to the first end of a bed and the second product delivered from the second end of the bed when the pressure in that bed is elevated to a higher working pressure, while the second product is exhausted from the first end of the bed at a lower working pressure which is the low pressure of the cycle.

The conventional process for gas separation by pressure swing adsorption uses two or more adsorbent beds in parallel, with directional valving at each end of each adsorbent bed to connect the beds in alternating sequence to pressure sources and sinks, thus establishing the changes of working pressure and flow direction. This conventional pressure swing adsorption process makes inefficient use of applied energy, because of irreversible expansion over the valves over large pressure differences while switching the adsorbent beds between higher and lower pressures.

DISCLOSURE OF INVENTION

The present invention is intended to enable high frequency operation of pressure swing and vacuum swing adsorption processes, with high energy efficiency and with compact machinery of low capital cost. The invention applies in particular to air separation.

The invention provides an apparatus for PSA separation of a gas mixture containing a more readily adsorbed component and a less readily adsorbed component, with the more readily adsorbed component being preferentially adsorbed from the feed gas mixture by an adsorbent material under increase of pressure, so as to separate from the gas mixture a heavy product gas enriched in the more readily adsorbed component, and a light product gas enriched in the less readily adsorbed component and depleted in the more readily adsorbed component. The apparatus includes centrifugal compression machinery cooperating with one or multiple PSA modules in parallel. Each PSA module comprises a plurality of adsorbers, with each adsorber having a flow path contacting adsorbent material between first and second ends of the flow path.

Each PSA module further has a first valve means cooperating with the adsorbers to admit feed gas to the first ends of the adsorbers, and to exhaust heavy product gas from the first ends of the adsorbers. Each PSA module also has a second valve means cooperating with the adsorbers to deliver light product gas from the second ends of the adsorbers, to withdraw light reflux gas from the second ends of the adsorbers, and to return light reflux gas to the second ends of the adsorbers. The term "light reflux" refers to withdrawal of light gas (enriched in the less readily adsorbed component) from the second ends of adsorbers via the second valve means, followed by pressure let-down and return of that light gas to other adsorbers at a lower pressure via the second valve means. The first and second valve means are operated so as to define the steps of a PSA cycle performed sequentially in each of the adsorbers, while controlling the timings of flow at specified total pressure levels between the adsorbers and the compression machinery.

The PSA process of the invention establishes the PSA cycle in each adsorber, within which the total working pressure in each adsorber is cycled between a higher pressure and a lower pressure of the PSA cycle. The PSA process also provides a plurality of intermediate pressures between the higher and lower pressure. The compression machinery of the apparatus in general includes a feed gas centrifugal compressor and a second product gas exhauster. The exhauster would be an expander (e.g. radial inflow turbine) when the lower pressure is at least atmospheric pressure. The exhauster would be a vacuum pump when the lower pressure is subatmospheric. A light reflux gas expander may also be provided for energy recovery from light reflux pressure let-down, and may for example be used to drive a light product compressor.

In the present invention, the feed compressor will typically supply feed gas, in several stages at discrete intermediate pressures for feed pressurization of the adsorbers as well as the higher pressure for light product production, to the first valve means. The exhauster will typically receive second product gas, in several stages at discrete intermediate pressures for countercurrent blowdown of the adsorbers as well as the lower pressure, from the first valve means. The light reflux expander may also perform pressure let-down on several separate light reflux stages, sequentially drawn from the second valve means at a set of discrete intermediate pressure levels, and after expansion returned to the second valve means at a lower set of discrete intermediate pressure levels. Heat exchangers may be provided to heat gas streams about to be expanded, for thermally boosted energy recovery.

In order for the flowing gas streams entering or exiting the compression machinery at each pressure level to be substantially uniform in pressure and velocity, each PSA module will preferably have a sufficiently large number of adsorbers for several adsorbers to be undergoing each step of the PSA cycle at any moment. During pressurization and blowdown steps, the several adsorbers passing through the step would be in sequentially phased converging approach to the nominal pressure level of each step by a throttling pressure equalization from the pressure level of the previous step experienced by the adsorbers. Flow is being provided to the adsorbers in a pressurization step or withdrawn in a blowdown step by the compression machinery at the nominal pressure level of that step. Hence flow and pressure pulsations seen by the compression machinery at each intermediate pressure level are minimal by averaging from the several adsorbers passing through the step, although each adsorber undergoes large cyclic changes of pressure and flow.

A preferred way to provide a large number of adsorbers in a mechanically simple PSA module is to install those adsorbers as angularly spaced elements in a rotor, whose opposed faces engaging across sealing faces with a ported stator sealing faces will provide the first and second valve means. By providing a sufficient number of ports with suitable angular spacing to accommodate each of the desired pressure levels (higher, lower and intermediate) in each of the first and second valve faces, a desired PSA cycle can be achieved. The present invention provides high surface area parallel passage adsorbers suitable for high frequency operation, these adsorbers being comprised of layered thin sheets supporting the adsorbent and with spacers between the sheets to establish flow channels, with the adsorbers installed to fill the volume of an annular cylindrical vessel, and with the adsorbers being angularly spaced about the axis of the annular vessel with the angular spacing of the adsorbers corresponding to the staggered phases with which the pressure swing adsorption cycle is conducted within those adsorbers. This aspect of the invention is usefully applicable without limitation to the case that the vessel is rotating to provide the valving function of the pressure swing adsorption process, and also to the case of a non-rotating vessel containing multiple adsorbers whose pressure swing cycle may be controlled by rotating multiport valves. In preferred embodiments, the cylindrical vessel is a rotor, whose rotation in engagement to first and second valve faces provides the valving function.

If a smaller number of adsorbers is used in each PSA module, surge absorber chambers will be needed to isolate each stage of the compression machinery from excessive pulsations of flow and pressure. With sufficiently large surge absorber chambers, flow and pressure pulsations seen by the compression machinery are again minimized.

The architecture of adsorbers has three main hierarchial levels to be addressed:

1) the micropores where selective adsorption takes place within the adsorbent media
2) the macropores providing access into the adsorbent media at approximately micron scale from the flow channels, and desirably with minimal mass transfer resistance so that departures from equilbrium between the micropores and the adjacent flow channels are always minimized,
3) the flow channels between bodies of adsorbent media, and along which a concentration gradient is established by the process.

In PSA gas separation using zeolite molecular sieve adsorbents, the conventional art has established a remarkable, precisely organized architecture at the atomic scale by which the micropores are defined by the zeolite crystal framework. The micropores are at approximately nanometer scale, and are organized up to the typical scale of zeolite crystallites of one or a few microns.

In conventional PSA technology, the zeolite crystallites are agglomerated into an amorphous macroporous structure to form adsorbent pellets or beads. The macropores are provided by the more or less random network of interconnecting cavities between the crystallites, allowing for space taken up by the binder. The resulting macropores will have a rather high tortuosity factor, multiplying the effective length of the macropores by a factor of typically three to increase mass transfer diffusional resistance correspondingly.

The adsorbent beads are typically formed at the scale of one or a few millimeters, and are loaded into the adsorber containment vessel to form a packed bed. The flow channels are provided by the voidage fraction between the beads, and typically have a length of the order of one meter. The random assembly of the packed bed, along with mixing events as the flow splits and recombines around the beads, results in axial dispersion which degrades the sharpness of the concentration wavefront established by the separation process. The packed bed also has inherently high pressure drop in the flow channels.

While prior art adsorbent beds based on zeolite molecular sieves are ideally organized at the micropore scale of the zeolite crystal lattice, their architecture is far from satisfactory at the scale of the macropores (bead architecture) and the flow channels (adsorber architecture). Packed beds of granular beads are subject to pressure drop and fluidization constraints which make it impracticable to operate with small diameter beads, much smaller than 1 millimeter diameter. The mass transfer macropore diffusional resistance of relatively large beads, further exacerbated by the macropore tortuosity factor, preclude efficient sustained operation at PSA cycle frequencies greater than approximately 10 cycles per minute.

An improved architecture of the adsorbent media bodies and the flow channels is one in which the adsorbent is supported in the form of "adsorbent sheets". The adsorbent sheets are thin sheets (either as the adsorbent with a composite reinforcement, or as an inert sheet or foil coated with the adsorbent), with the flow channels established by spacers as parallel channels between adjacent pairs of sheets. This "adsorbent laminate" configuration has much lower pressure drop than packed beds, and avoids the fluidization problem of packed beds. In experimental adsorbers tested to date, the adsorbent sheets are in the range of 100 to 175 microns thick. The channel width between adjacent adsorbent sheets of the experimental adsorbers has been in the range of 50% to 100% of the adsorbent sheet thickness.

Intermediate between the microscale of the zeolite crystallites and the macroscale of the laminate, the mesoscale architecture of the macropore network remains a challenge to be organized. The challenge is to improve on the highly tortuous macropore network provided by the amorphous structure of zeolite crystallites cemented together by conventional binders. Typical tortuosity factors in zeolite adsorbent pellets are in the order of 3 to 4. Straightening the macropores into a parallel bundle of straight pores orthogonal to the external surface of the adsorbent sheet would ideally result in a tortuosity factor of 1, greatly reducing macropore diffusional resistance which usually controls mass transfer. As the macropore diffusional time constant is proportional to the tortuosity factor and inversely proportional to the adsorbent characteristic dimension (pellet diameter or laminate adsorbent sheet thickness), a factor of 4 reduction in tortuosity is equivalent to a factor of 2 reduction in the characteristic dimension. Hence, for equal macropore mass transfer resistance at the same cycle frequency, the adsorbent characteristic dimension may be increased to reduce adsorbent flow channel surface area and consequently adsorbent manufacturing cost, and also to reduce pressure drop in the flow channels. Alternatively, the characteristic dimension may be held the same, and the reduced tortuosity and reduced macropore resistance may then be exploited to increase cycle frequency. This reduces the volume of the adsorbent, and again reduces the installed cost of the adsorbent.

Accordingly, an important aspect of the invention is alignment of macropore channels for improved high frequency PSA adsorbers. In this aspect of the invention, the adsorber provides contact between a flow channel and a wall of macroporous adsorbent material, with the macropore channels substantially rectilinear and orthogonal to the wall. The wall may be the surface of an adsorbent pellet, or more preferably the surface of an adsorbent sheet contacting a flow channel between parallel adjacent adsorbent sheets.

According to a further aspect of the invention there is provided an adsorber element for contacting an adsorbent material to a fluid mixture, the adsorber element being formed from layered sheets comprising the adsorbent material and a support material, with spacers between the sheets to establish flow channels in a flow direction parallel to the sheets and between adjacent pairs of sheets, the adsorber element having first and second ends defining a flow path in the flow direction through the adsorber element and along the flow channels established by the spacers.

According to another aspect of the invention there is provided an adsorbent structure suitable for use in a pressure swing apparatus, comprising at least one fluid flow channel; at least one wall defining said flow channel, said wall comprising a plurality of layered sheets of adsorbent material transverse to the flow channel, and wherein the sheets are spaced to define macropore channels between adjacent sheets, which macropore channels are substantially perpendicular to said flow channel.

Further objects and advantages of the invention will become apparent from the description of preferred embodiments of the invention below.

DETAILED DESCRIPTION OF PREFERRED EMBODIMENTS

Figure 1:
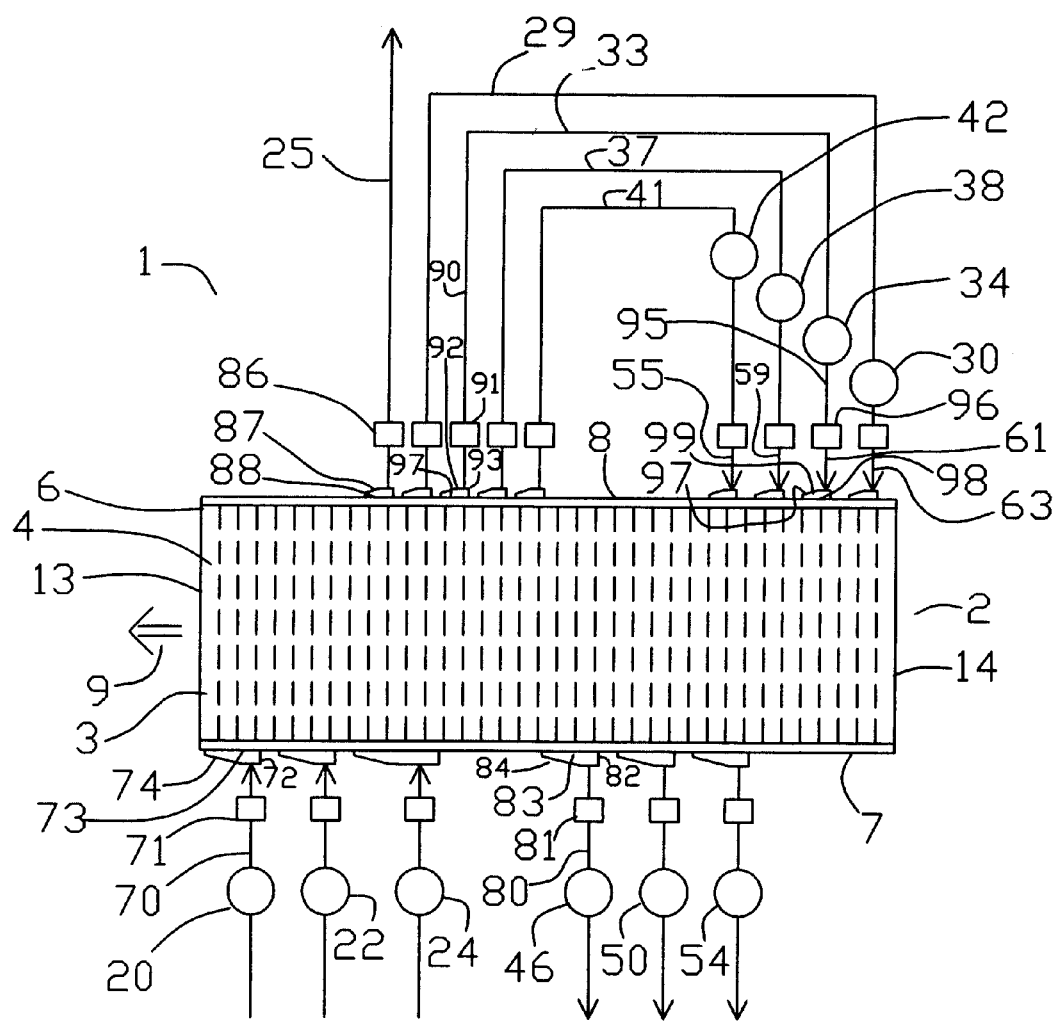
FIG. 1 shows a simplified schematic of a PSA apparatus.
Figure 2:
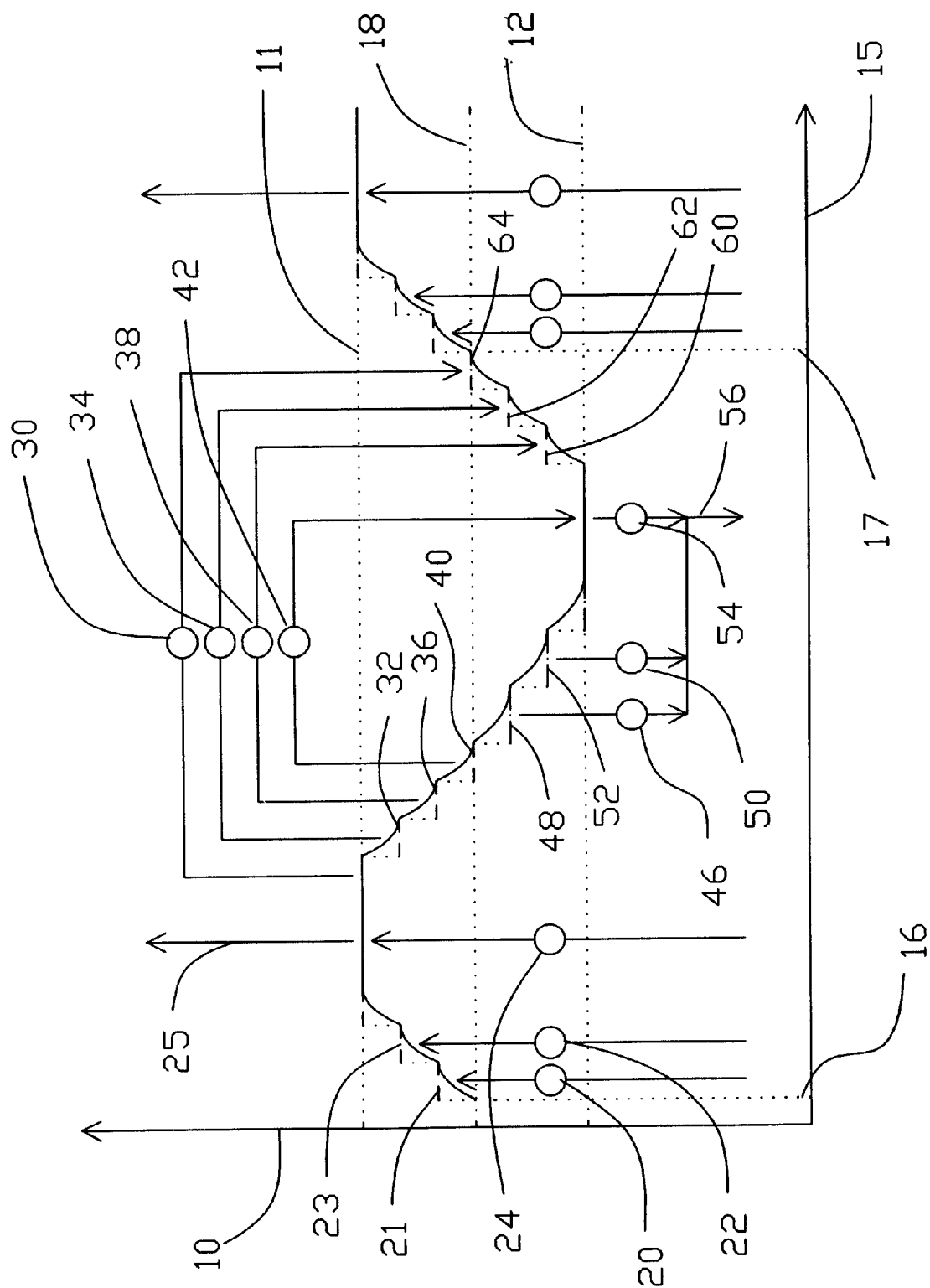
FIG. 2 shows a typical PSA cycle, in the format to which the invention shall be applied.

FIGS. 1 and 2

FIG. 1 shows an elementary PSA apparatus 1 with an adsorber assembly 2 having a plurality of "N" cooperating adsorbers 3 in parallel. Each adsorber has a flow path 4 between first end 5 and second end 6 of the adsorber 3, with adsorbent material contacting the flow path. Cooperating with the adsorbers are first valve means 7 and second valve means 8. Arrow 9 indicates the direction of progression of the adsorbers in being connected to ports of the first and second valve means as shown in FIG. 1. In the case of a rotary adsorber, as in the preferred embodiments of the invention, adsorber rotor 2 is shown in FIG. 1 unrolled in a 360 section about its rotary axis so that rotation causes the adsorbers to advance in the direction of arrow 9 to undergo the cycle of FIG. 2.

The left hand edge 13 of the unrolled view of rotor 2 returns to right hand edge 14 after rotation of 360°. It is also possible within the invention to have an integral multiple of "M" groups of "N" adsorbers in a single rotor 2, so that the angular extent for edge 13 to edge 14 is 360/M. This has the disadvantage of greater complexity of fluid connections to the first and second valve means, but the advantages of slower rotational speed (by a factor of "M" for the same PSA cycle frequency) and a symmetric pressure and stress distribution. With "M"=2, FIG. 1 represents each 180° side of a rotor according to the invention.

FIG. 2 shows the PSA cycle undergone sequentially by each of the "N" adsorbers 3 over a cycle period "T". The cycle in consecutive adsorbers is displaced in phase by a time interval of T/N. In FIG. 2 the vertical axis 10 indicates the working pressure in the adsorbers and the pressures in the first and second compartments. Pressure drops due to flow within the adsorber elements are here neglected. The higher and lower working pressures of the PSA process are respectively indicated by dotted lines 11 and 12.

The horizontal axis 15 indicates time, with the PSA cycle period defined by the time interval between points 16 and 17. At times 16 and 17, the working pressure in adsorber 3 is pressure 18. Starting from time 16, the cycle begins as the first end 5 of adsorber 3 is opened by the first valve means 7 to first feed supply means 20 at the first intermediate feed pressure 21. The pressure in that adsorber rises from pressure 18 at time 17 to the first intermediate feed pressure 21. Proceeding ahead, the first end 5 is opened next to second feed supply means 22 at the second intermediate feed pressure 23. The adsorber pressure rises to the second intermediate feed pressure.

Then the first end 5 is opened to a third feed supply means 24 at the higher pressure of the PSA process. Once the adsorber pressure has risen to substantially the higher working pressure, its second end 6 is opened by the second valve means to light product delivery conduit 25 to deliver purified light product. While feed gas is still being supplied to the first end of adsorber 3 from the third feed supply means, the second end 6 is next closed to light product delivery conduit 25, and is opened to deliver "light reflux" gas (enriched in the less readily adsorbed component, similar to second product gas) by conduit 29 to first light reflux pressure let-down means 30. The light reflux pressure let-down means may be an expander with optional heat exchangers such as an inlet heater, or a throttle orifice. All or some of the feed supply means may be feed compression stages. One of the feed supply means may be an external source, such as the ambient atmosphere for air purification or air separation applications.

The first end 5 of adsorber 3 is then closed by the first valve means, while the second end 6 is opened successively by the second valve means to (a) drop the adsorber pressure to the first cocurrent blowdown pressure 32 while delivering light reflux gas by conduit 33 to second light reflux pressure letdown means 34, (b) drop the adsorber pressure to the second cocurrent blowdown pressure 36 while delivering light reflux gas by conduit 37 to third light reflux pressure letdown means 38, and (c) drop the adsorber pressure to the third cocurrent blowdown pressure 40 while delivering light reflux gas by conduit 41 to fourth light reflux pressure letdown means 42. Second end 6 is then closed for an interval, until the light reflux return steps following the countercurrent blowdown steps.

The light reflux pressure let-down means may be mechanical expansion stages for expansion energy recovery, or may be restrictor orifices or throttle valves for irreversible pressure let-down.

Either when the second end 6 is closed after the final light reflux exit step (as shown in FIG. 2), or earlier while light reflux exit steps are still underway, first end 5 is opened to first exhaust means 46, dropping the adsorber pressure to the first countercurrent blowdown intermediate pressure 48 while releasing "heavy" gas (enriched in the more strongly adsorbed component) to the first exhaust means. Next, first end 5 is opened to second exhaust means 50, dropping the adsorber pressure to the second countercurrent blowdown intermediate pressure 52 while releasing "heavy" gas. Then first end 5 is opened to third exhaust means 54, dropping the adsorber pressure to the lower pressure 12 of the PSA process while releasing "heavy" gas. Once the adsorber pressure has substantially reached the lower pressure while first end 5 is open to the third exhaust means 54, the second end 6 is opened to receive fourth light reflux gas (as purge gas) from fourth light reflux pressure let-down means 42 by conduit 55 in order to displace more heavy gas into the third exhaust means. The heavy gas from the first, second and third exhaust means may be delivered together as the heavy product 56. All or some of the exhaust means may be mechanical exhauster stages, alternatively either expansion stages if the pressure is to be reduced, or vacuum pumping stages if the pressure is to be increased to ambient pressure, or exhaust compression stages if the exhaust of second product is to be delivered at an elevated pressure. An exhaust means may also be provided by venting to an external sink, e.g. the ambient atmosphere.

The adsorber is then repressurized by light reflux gas after the first end 5 is closed. In succession, the second end 6 is opened (a) to receive light reflux gas by conduit 59 from the third light reflux pressure letdown means 38 to raise the adsorber pressure to the first light reflux pressurization pressure 60, (b) to receive light reflux gas by conduit 61 from the second light reflux pressure letdown means 34 to raise the adsorber pressure to the second light reflux pressurization pressure 62, and (c) to receive light reflux gas by conduit 63 from the first light reflux pressure letdown means 30 to raise the adsorber pressure to the third light reflux pressurization pressure 64. Unless feed pressurization has already been started while light reflux return for light reflux pressurization is still underway, the process begins feed pressurization for the next cycle after time 17 as soon as the third light reflux pressurization step has been concluded.

From each feed supply means (e.g. 20), the feed flow is delivered by a conduit 70 through an optional surge absorber chamber 71 to a feed compartment 72 opening to a feed port 73 in first valve means 7. Feed compartment 72 may be open to several adsorbers simultaneously, and may have a restricted entrance 74 so as to provide a gradual throttling equalization of pressure as each adsorber is opened to feed compartment 72.

To each exhaust means (e.g. 46), the exhaust flow is delivered by a conduit 80 through an optional surge absorber chamber 81 from an exhaust compartment 82 opening to an exhaust port 83 in first valve means 7. Exhaust compartment 82 may be open to several adsorbers simultaneously, and may have a restricted entrance 84 so as to provide a gradual throttling equalization of pressure as each adsorber is opened to exhaust compartment 82.

To light product delivery conduit 25, the light product is delivered through an optional surge absorber chamber 86 from light product exit compartment 87 opening to a light product port 88 in second valve means 8.

To each light reflux pressure letdown means (e.g. 34), the light reflux flow is delivered by a conduit 90 through an optional surge absorber chamber 91 from a light reflux exit compartment 92 opening to a light reflux exit port 93 in second valve means 8. Light reflux exit compartment 92 may be open to several adsorbers simultaneously, and may have a restricted entrance 94 so as to provide a gradual throttling equalization of pressure as each adsorber is opened to light reflux exit compartment 92.

From each light reflux pressure letdown means (e.g. 34), the light reflux flow is delivered by a conduit 95 through an optional surge absorber chamber 96 to a light reflux entrance compartment 97 opening to a light reflux entrance port 98 in second valve means 8. Light reflux exit compartment 97 may be open to several adsorbers simultaneously, and may have a restricted entrance 99 so as to provide a gradual throttling equalization of pressure as each adsorber is opened to light reflux entrance compartment 97.

The rate of pressure change in each pressurization or blowdown step may thus be restricted by throttling in compartments of the first and second valve means, or by throttling in the ports at first and second ends of the adsorbers, resulting in the typical pressure waveform depicted in FIG. 2. Excessively rapid rates of pressure change would subject the adsorber to mechanical stress, while also causing flow transients which would tend to increase axial dispersion of the concentration wavefront in the adsorber. Pulsations of flow and pressure are minimized by having a plurality of adsorbers simultaneously transiting each step of the cycle, and/or by providing surge absorbers in the conduits connecting to the first and second valve means.

It will be evident that the cycle shown in FIG. 2 could be generalized by having more or fewer intermediate stages in each major step of feed pressurization, countercurrent blowdown exhaust, or light reflux. Furthermore, in air separation or air purification applications, a stage of feed pressurization (typically the first stage) could be performed by equalization with atmosphere as an intermediate pressure of the cycle. Similarly, a stage of countercurrent blowdown could be performed by equalization with atmosphere as an intermediate pressure of the cycle.

FIG. 3

Figure 3:
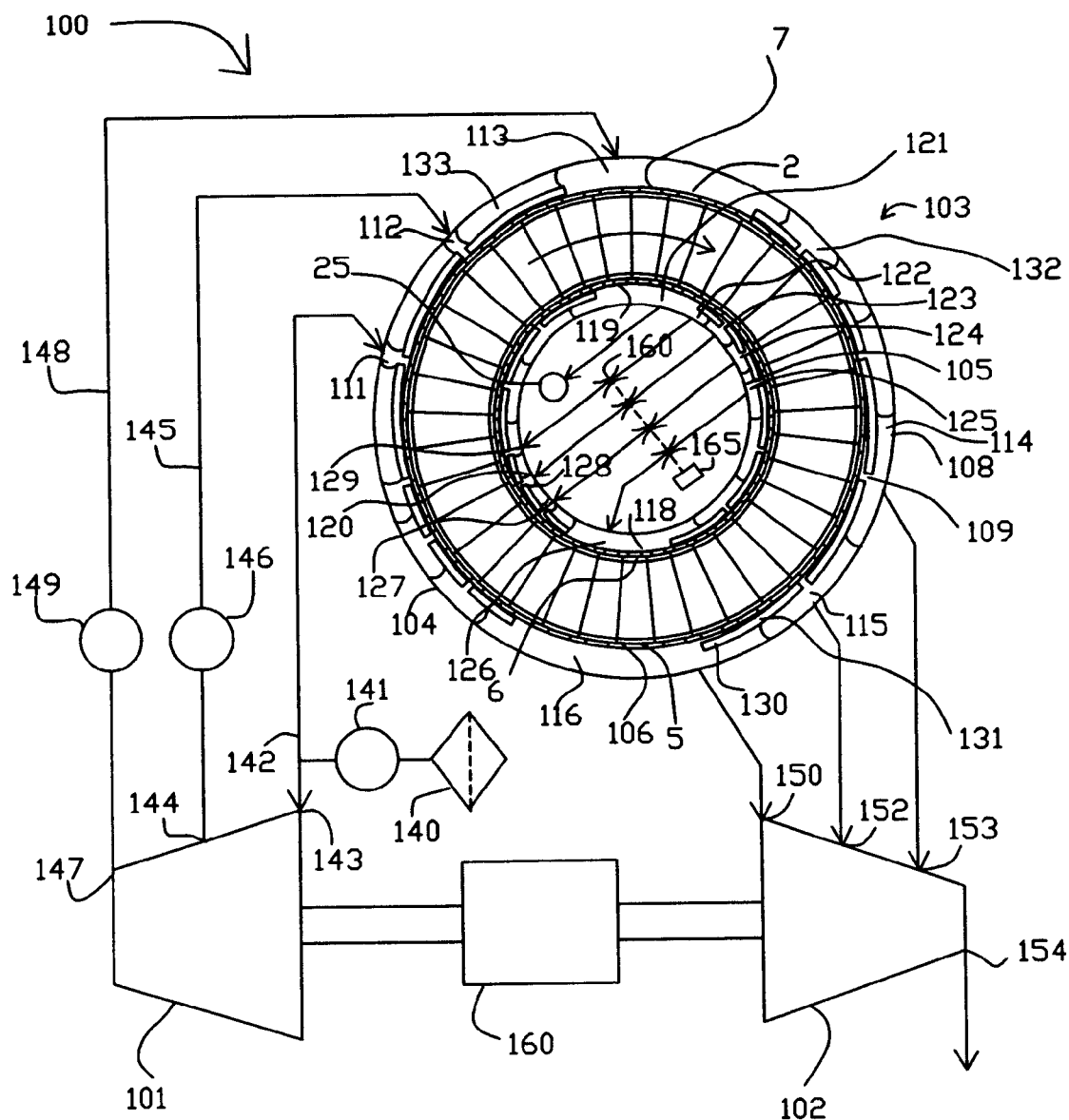
FIG. 3 shows a radial flow rotary module for VPSA oxygen production with a compressor and a vacuum pump exhauster.

FIG. 3 shows a simplified schematic of a VPSA (vacuum pressure swing adsorption) air separation system 100, with a mutilstage or split stream centrifugal compressor 101 and a multistage or split stream exhaust vacuum pump 102. The rotary adsorber module 103 includes adsorber rotor 2, and a stator assembly comprising a first valve stator 104 and a second valve stator 105. Rotor 2 may be configured for radial flow as suggested in FIG. 3, or for axial flow. As shown, the compressor 101 and the vacuum pump 102 may be rotatably coupled to a suitable drive mechanism, such as a motor 160.

Rotor 2 contains the "N" adsorbers 3, with the flow path here oriented radially between first end 5 and second end 6 of the adsorbers. The adsorber first ends 5 open by apertures 106 to a sealing face 107 with the first valve stator 108, which has ports 109 to define the first valve means 7. First valve stator 108 has a plurality of functional compartments in fluid communication to sealing face 107 by ports 109, including a first feed pressurization supply compartment 111, a second first feed pressurization supply compartment 112, a feed production supply compartment 113 at substantially the higher pressure, a first countercurrent blowdown exhaust compartment 114, a second countercurrent blowdown exhaust compartment 115, and a purge exhaust compartment 116 at substantially the lower pressure.

The adsorber second ends 6 open by apertures 118 to a sealing face 119 with the second valve stator 105 which has ports 120 to define the second valve means 8. Second valve stator 105 includes, with each compartment in fluid communication to sealing face 119 by ports 120, a light product delivery compartment 121 at substantially the higher pressure, a first light reflux exit compartment 122 which is here simply the downstream end of compartment 121, a second light reflux exit compartment 123, a third light reflux exit compartment 124, a fourth light reflux exit compartment 125, a fourth light reflux return compartment 126 for purge at substantially the lower pressure, a third light reflux return compartment 127, a second light reflux return compartment 128, and a first light reflux return compartment 129. The angular spacing of ports communicating to the compartments in the first and second valve stators defines the timing of the PSA cycle steps similar to the cycle of FIG. 2.

In this example, sealing faces 107 and 119 are respectively defined by the outer and inner radii of the annular rotor 2. Fluid sealing between the functional compartments in sealing face is achieved by clearance seals. The clearance seals are provided as slippers 130 attached to the first and second valve stators by partitions 131. Partitions 131 provide static sealing between adjacent compartments. Slippers 130 engage the sealing faces with narrow fluid sealing clearances, which also provide throttling of gas flows between the adsorbers and functional compartments in each pressure-changing step, so that each adsorber may smoothly equalize its pressure to the pressure of the next functional compartment about to be opened to that adsorber. In addition to the functional compartments, static pressure balancing compartments (e.g. 132 and 133) are provided behind some clearance seal slippers. The static pressure balancing compartments are disposed in angular sectors of the first and second valve stators not used as functional compartments, in order to establish a controlled pressure distribution behind the clearance slippers so as to maintain their positive sealing engagement without excessive contact pressure and consequent friction.

Apparatus 100 has a feed air inlet filter 140, from which feed air is conveyed through optional dehumidifier 141 and conduit 142 to feed compressor inlet 143. In this example, the first intermediate feed pressurization pressure is selected to be substantially atmospheric pressure, so conduit 142 also communicates to first feed pressurization compartment 111. The feed compressor 101 has a first discharge port 144 at the second intermediate feed pressurization pressure communicating by conduit 145 and optional dehumidifier 146 to compartment 112, and a second discharge port 147 at substantially the higher pressure of the cycle pressure communicating by conduit 148 and optional dehumidifier 149 to compartment 113.

Exhaust vacuum pump 102 has a first inlet port 150 at substantially the lower pressure of the cycle in fluid communication with exhaust compartment 116, a second inlet port 152 at the second countercurrent blowdown pressure in fluid communication with compartment 115, and a third inlet port 153 at the first countercurrent blowdown pressure in fluid communication with compartment 114. Vacuum pump 102 compresses the combined exhaust and countercurrent blowdown gas as the second product gas enriched in the more readily adsorbed component to substantially atmospheric pressure, and discharges the second product gas from discharge port 154.

In the option of light reflux pressure let-down without energy recovery, throttle valves 160 provide pressure let-down for each of four light reflux stages, respectively between light reflux exit and return compartments 122 and 129, 123 and 128, 124 and 127, and 125 and 126 as illustrated. Actuator means 165 is provided to adjust the orifices of the throttle valves.

FIGS. 4, 5, 6 and 7

Figure 4:
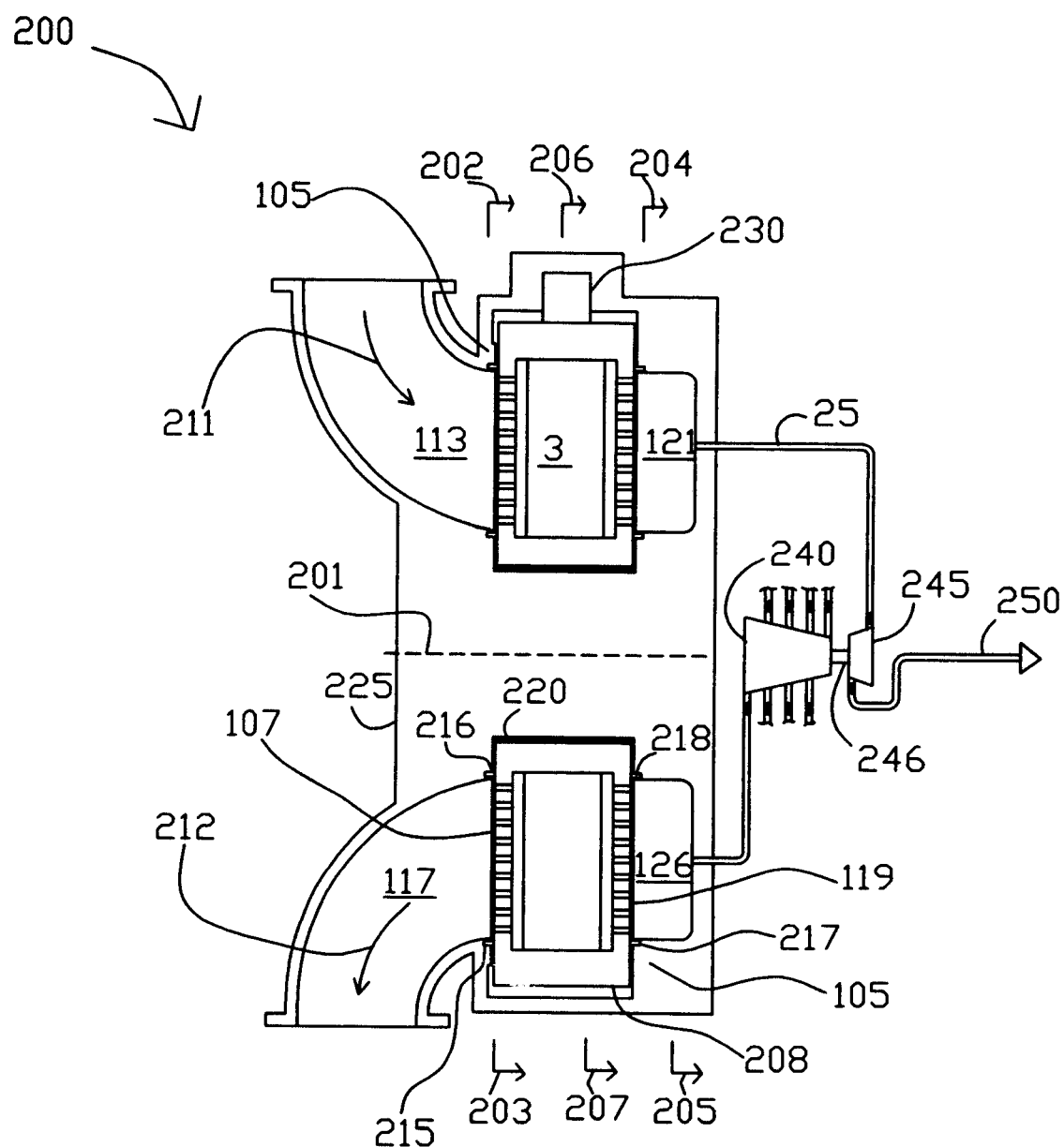
FIGS. 4, 5, 6 and 7 show an axial flow rotary module for PSA oxygen production.
Figure 5:
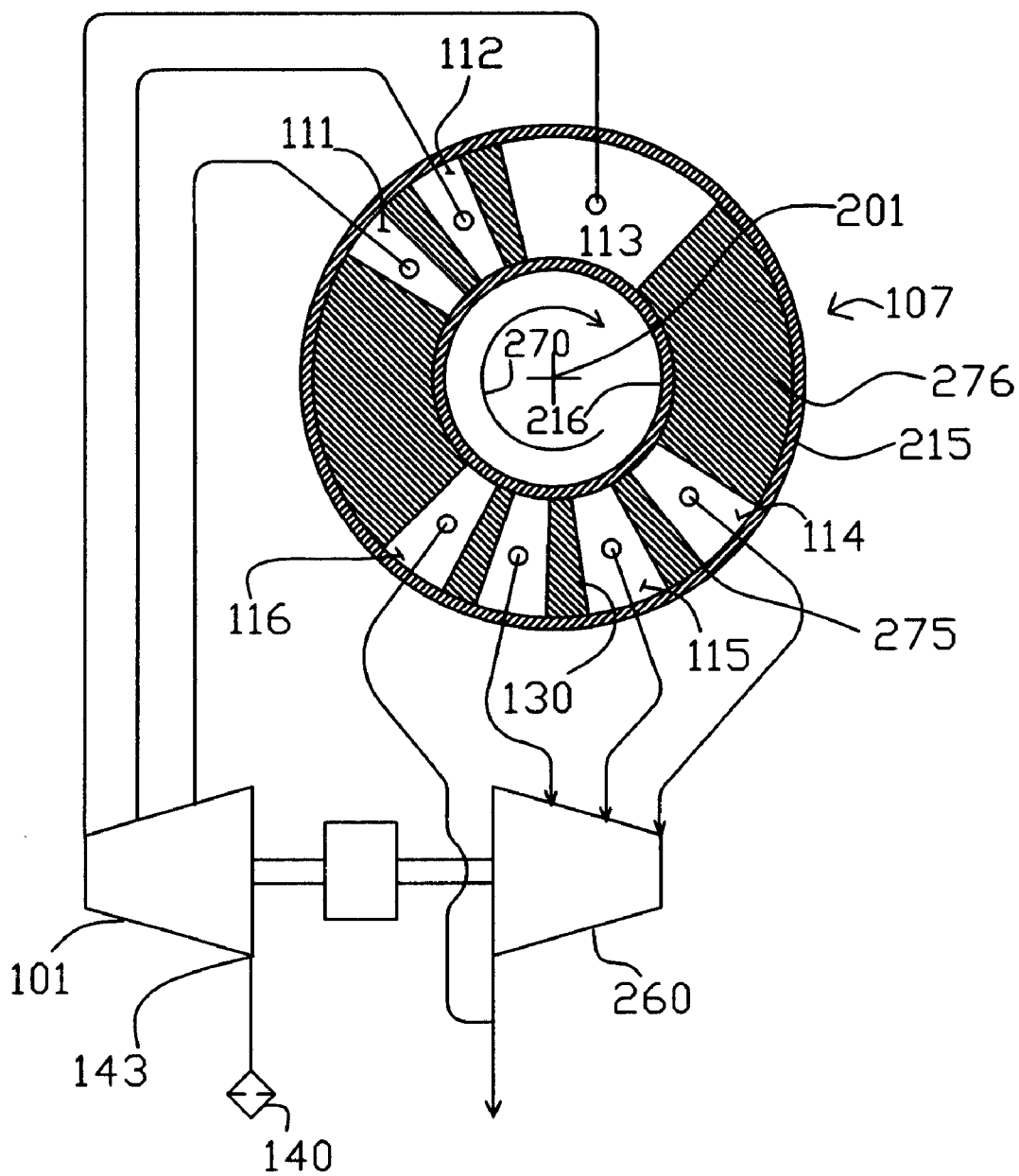
Figure 6:
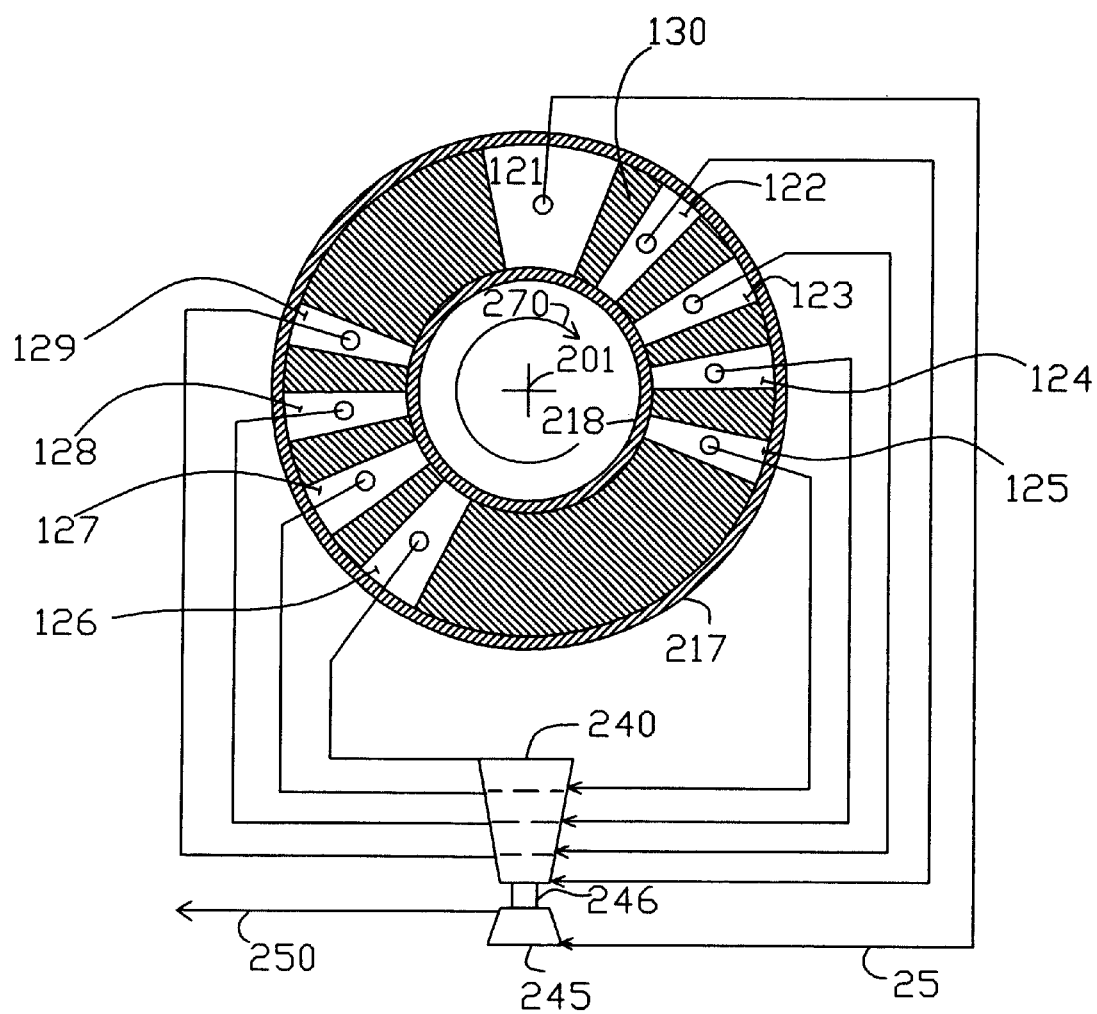
Figure 7:
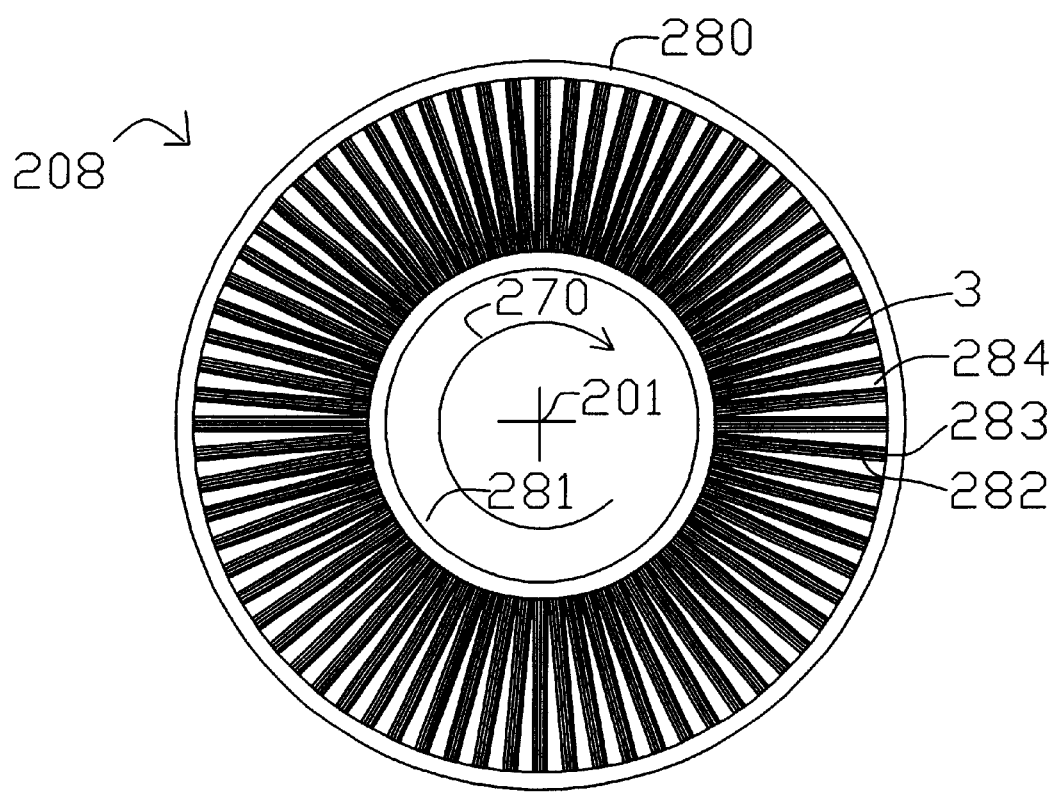

FIG. 4 shows an axial flow rotary PSA module 200, particularly suitable for smaller scale oxygen generation. The flow path in adsorbers 3 is now parallel to axis 201. The steps of the process and functional compartments are still in the same angular relationship regardless of a radial or axial flow direction in the adsorbers. FIGS. 5, 6 and 7 are cross sections of module 200 in the planes respectively defined by arrows 202–203, 204–205, and 206–207. FIG. 4 is an axial section of module 200 through compartments 113 and 121 at the higher pressure, and compartments 126 and 117 at the lower pressure. The adsorber rotor 2 contains the "N" adsorbers 3 in adsorber wheel 208, and revolves between the first valve stator 103 and the second valve stator 105. Compressed feed air is supplied to compartment 113 as indicated by arrow 211, while nitrogen enriched exhaust gas is exhausted from compartment 117 as indicated by arrow 212.

At the ends of rotor 2, circumferential seals 215 and 216 bound first sealing face 107, and circumferential seals 217 and 218 bound second sealing face 119. The sealing faces are flat discs. The circumferential seals also define the ends of clearance slippers 130 in the sealing faces between the functional compartments. Rotor 2 is supported by bearing 220 in housing 225, which is integrally assembled with the first and second valve stators. Rotor 2 is driven by rim drive motor 230, which may have a friction, geared or belt engagement with the outer rim of rotor 2.

Illustrating the option of light reflux pressure letdown with energy recovery, a split stream light reflux expander 240 is provided to provide pressure let-down of four light reflux stages with energy recovery. The light reflux expander provides pressure let-down for each of four light reflux stages, respectively between light reflux exit and return compartments 122 and 129, 123 and 128, 124 and 127, and 125 and 126 as illustrated.

Light reflux expander 240 is coupled to a light product pressure booster compressor 245 by drive shaft 246. Compressor 245 receives the light product from conduit 25, and delivers light product (compressed to a delivery pressure above the higher pressure of the PSA cycle) to delivery conduit 250. Since the light reflux and light product are both enriched oxygen streams of approximately the same purity, expander 240 and light product compressor 245 may be hermetically enclosed in a single housing. This configuration of a "turbocompressor" oxygen booster without a separate drive motor is advantageous, as a useful pressure boost of the product oxygen can be achieved without an external motor and corresponding shaft seals, and can also be very compact when designed to operate at very high shaft speeds.

FIG. 5 shows the first valve face of embodiment 200 of FIG. 3, at section 202 to 203, with fluid connections to a multistage or split stream feed compressor 101 and to a multistage or split stream countercurrent blowdown expander 260 as in FIG. 4.

Arrow 270 indicates the direction of rotation by adsorber rotor 2. The open area of valve face 107 ported to the feed and exhaust compartments is indicated by clear angular segments 111 to 217 corresponding to those functional compartments, between circumferential seals 215 and 216. The substantially closed area of valve face 107 between functional compartments is indicated by cross-hatched sectors 275 and 276 which are clearance slippers 130. Typical closed sector 275 provides a transition for an adsorber, between being open to compartment 114 and open to compartment 115. Gradual opening is provided by a tapering clearance channel between the slipper and the sealing face, so as to achieve gentle pressure equalization of an adsorber being opened to a new compartment. Much wider closed sectors (e.g. 276) are provided to substantially close flow to or from one end of the adsorbers when pressurization or blowdown is being performed from the other end.

FIG. 6 shows the second valve face of embodiment 200 of FIG. 3, at section 204 to 205, with fluid connections to a split stream light reflux expander 240 and light product booster compressor 245 as in FIG. 5. Fluid sealing principles and alternatives are similar to those of FIG. 5. Similar principles and alternatives apply to radial flow and axial flow geometries, respectively sealing on cylindrical or disc faces.

FIG. 7 shows an adsorber wheel configuration for the embodiment of FIG. 4, at section 206–207. The adsorber configuration of FIG. 7 is similar to a radial flow geometry shown in copending U.S. patent application Ser. No. 08/995, 906. Here, "N"=72. The adsorbers 3 are mounted between outer wall 280 and inner wall 281 of adsorber wheel 208. Each adsorber comprises a rectangular flat pack of adsorbent sheets 282, with spacers 283 between the sheets to define flow channels here in the axial direction. Separators 284 are provided between the adsorbers to fill void space and prevent leakage between the adsorbers.

The adsorbent sheets comprise adsorbent material coupled to a reinforcement material. A suitable binder may be used to attach the adsorbent material to the reinforcement material. The reinforcement material may comprise, for example, a mineral fiber matrix, (such as a glass fiber matrix), a metal wire matrix (such as a wire mesh screen), or a metal foil (such as aluminum foil), which can be anodized. Examples of glass fiber matrices include woven and non-woven glass fiber scrims. For air separation to produce enriched oxygen, the adsorbent material typically comprises X, A or chabazite type zeolites, typically exchanged with lithium, calcium, strontium, magnesium and/or other cations, and with optimized silicon/aluminum ratios as well known in the art. The zeolite crystals are bound with silica, clay and other binders, or self-bound, within an adsorbent sheet matrix.

Satisfactory adsorbent sheets have been made by coating a slurry of zeolite crystals with binder constituents onto the reinforcement material, with successful examples including nonwoven fiber glass scrims, woven metal fabrics, and expanded aluminum foils. Spacers are provided by printing or embossing the adsorbent sheet with a raised pattern, or by placing a fabricated spacer between adjacent pairs of adsorbent sheets. Alternative satisfactory spacers have been provided as woven metal screens, non-woven fiber glass scrims, and metal foils with etched flow channels in a photolithographic pattern.

Typical experimental sheet thicknesses have been 150 microns, with spacer heights in the range of 100 to 150 microns, and adsorber flow channel length approximately 20 cm. Using X type zeolites, excellent performance has been achieved in oxygen separation from air at PSA cycle frequencies in the range of 30 to 150 cycles per minute.

FIG. 8

Figure 8:
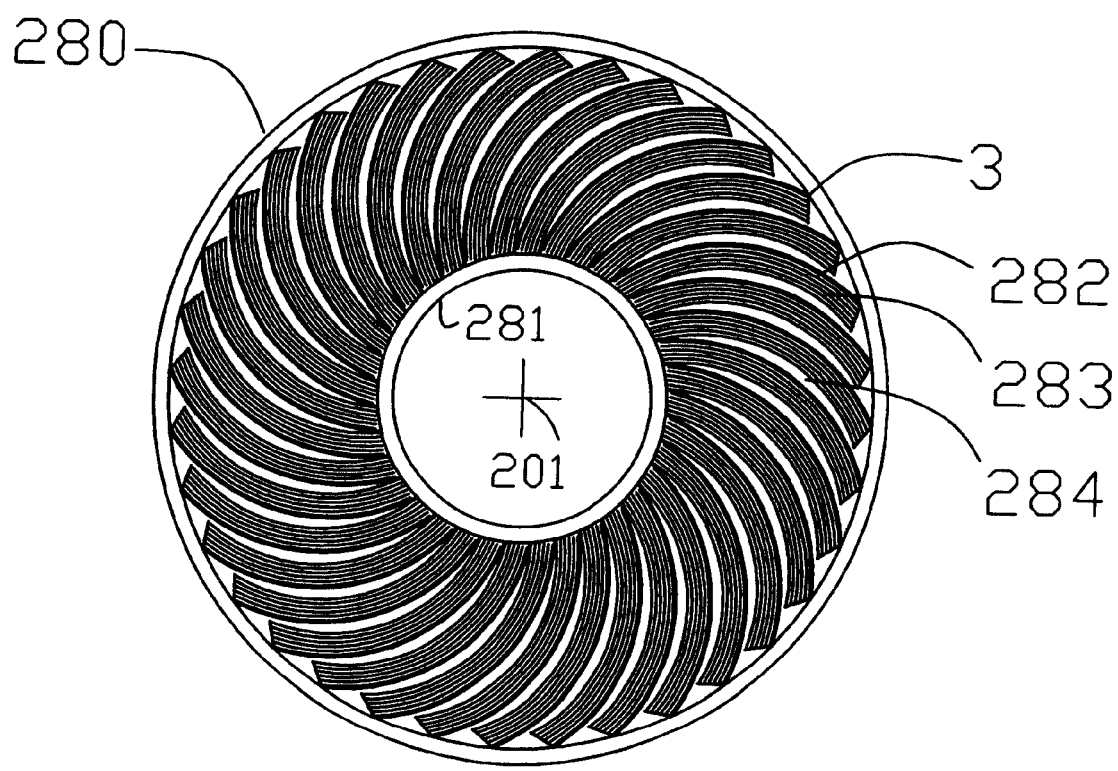
FIG. 8 shows an alternative rotor with curved adsorbers.

FIG. 8 shows an alternative configuration of rotor 208, in which the adsorbers 3 are again formed of a pack of rectangular adsorbent sheets with spacers, but with the sheets here curved to circular arcs rather than flat. Voids between the circularly curved adsorber packs are filled by separators 284. Such circularly curved adsorber packs may be made by forming the adsorbent sheets with spacers in a spiral roll on a circular cylindrical mandrel, and then slitting the spiral roll longitudinally to obtain the desired packs. Packing density could be further improved by forming the adsorber packs to a spiral rather than circular curve, for example by a pleating technique, or by longitudinally cutting a spiral roll formed on a noncircular mandrel whose shape in two to four identical angular sectors defines the desired spiral.

FIG. 9

Figure 9:
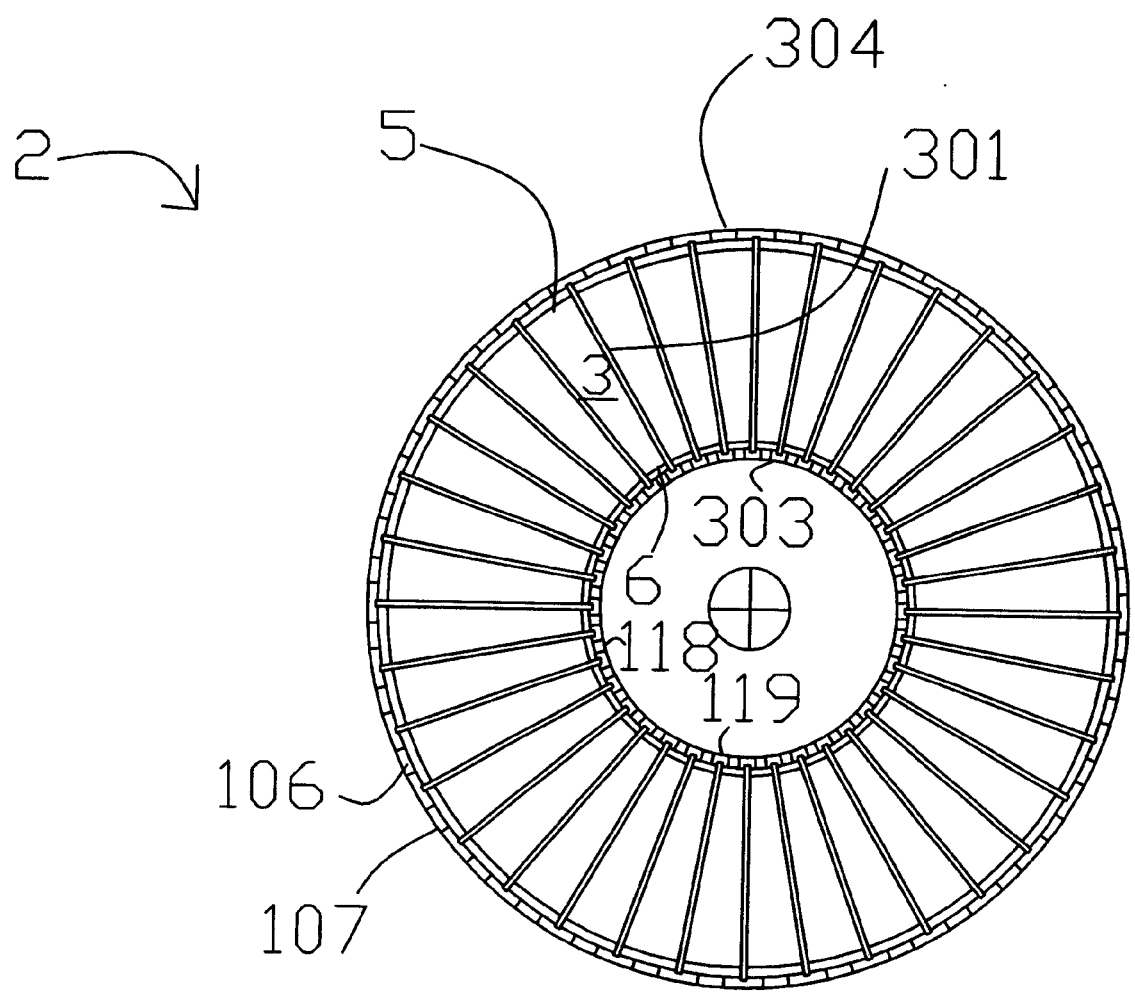
FIG. 9 shows the radial flow rotor of FIG. 3, with the adsorbers as angular sectors.

FIG. 9 shows an enlarged view of the radial flow rotor 2 of FIG. 3. The adsorbers 3 are contained in trapezoidal angular sectors between radial partitions 301. Partitions 301 are attached to outer rotor shell 303 and inner rotor shell 304. Outer shell 303 engages sealing face 107 and is perforated with apertures 106 communicating with the first ends 5 of adsorbers 3. Inner shell 304 engages sealing face 119 and is perforated with apertures 118 communicating with the second ends 6 of adsorbers 3. An important advantage of this geometry is the tapering of the adsorbers from the first to second ends of the flow path, thus reducing feed flow velocity and pressure drop adjacent the first end 5.

FIGS. 10–12

Figure 10:
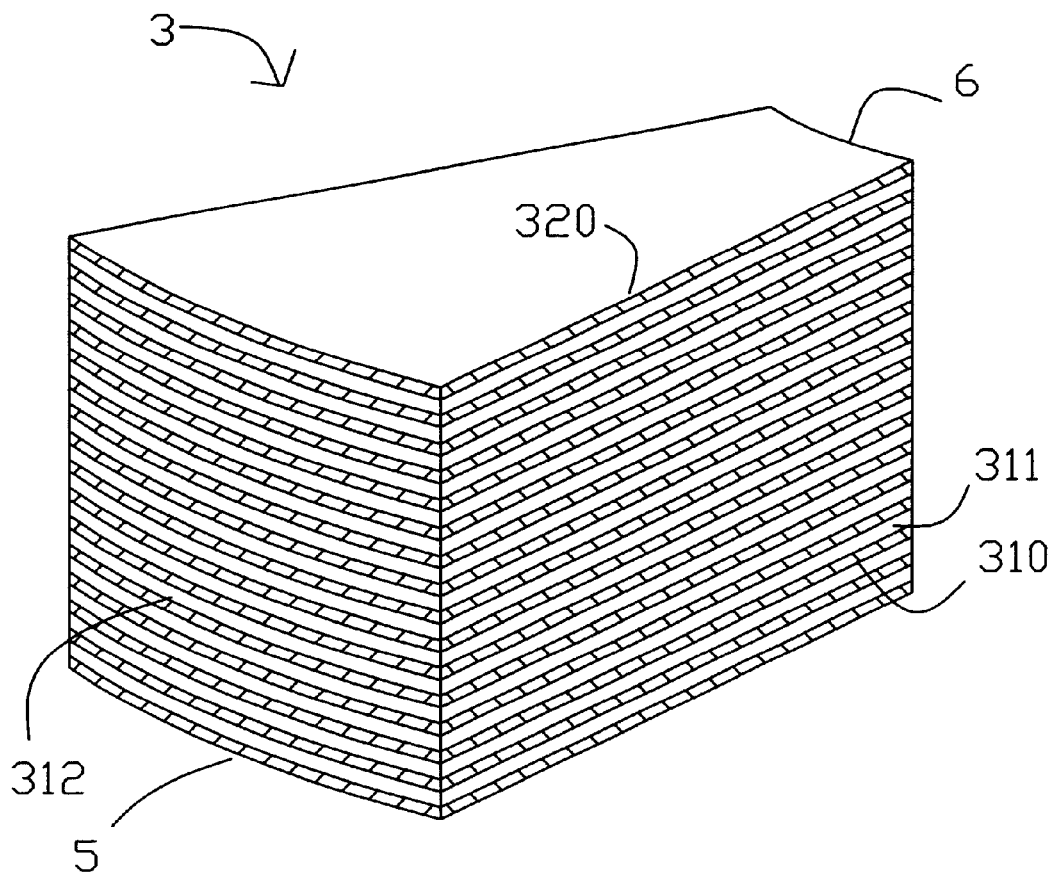
FIGS. 10 and 11 show a laminated sector adsorber for the rotor of FIG. 9, with the adsorbent sheets normal to the axis of the rotor.
Figure 11:
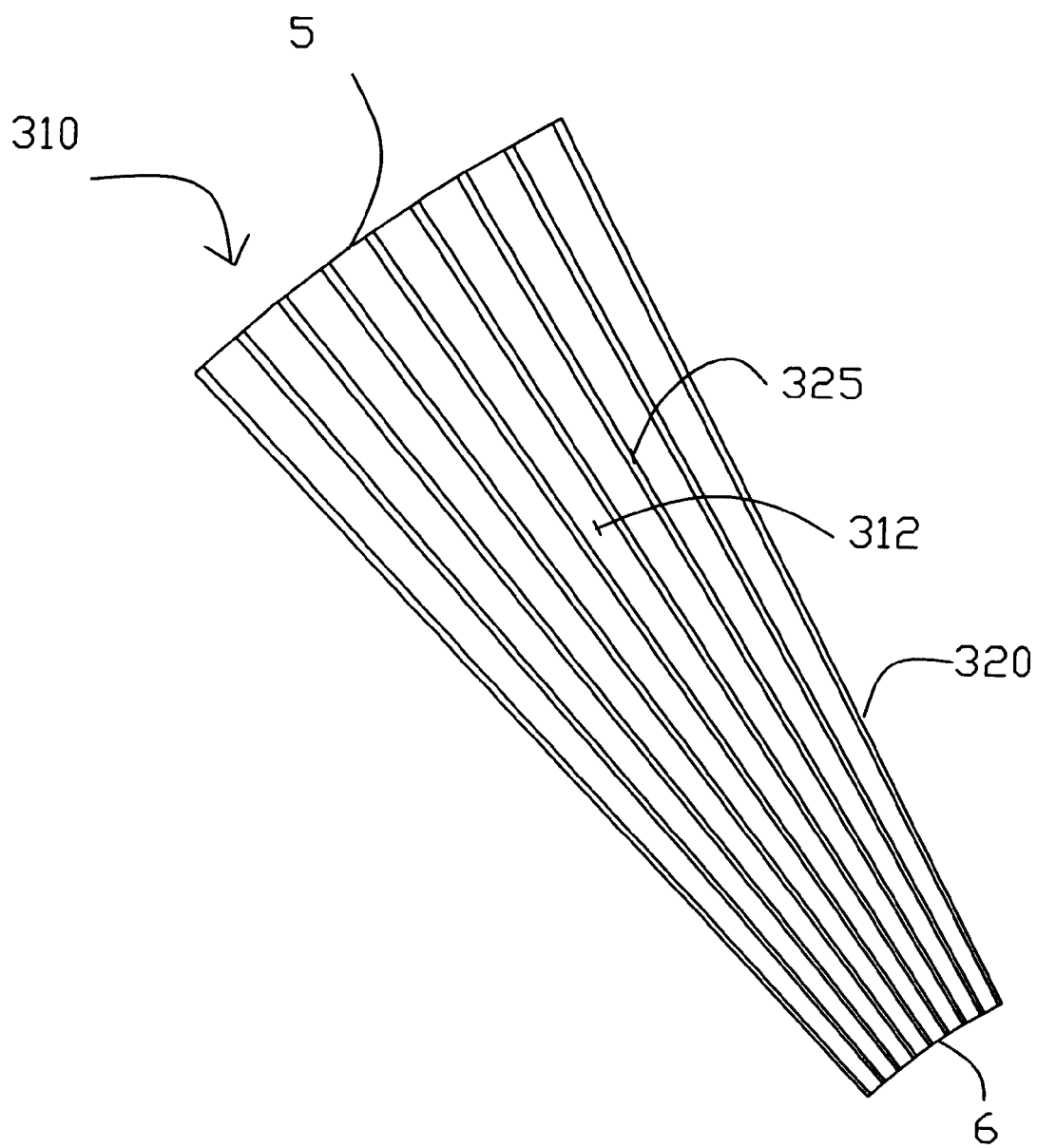
Figure 12:
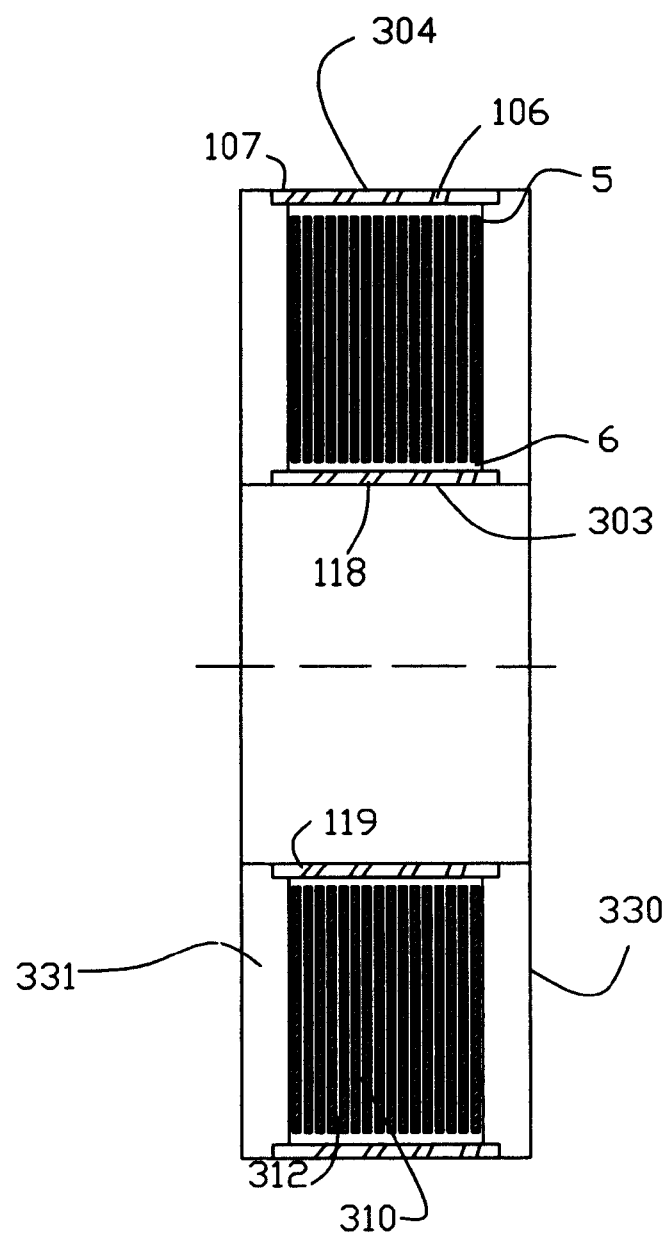
FIG. 12 is a section of the rotor of FIG. 9, using the adsorbers of FIG. 10.

FIGS. 10 and 11 show a laminated sector adsorber for the rotor of FIG. 9, with the adsorbent sheets normal to the axis of the rotor. The flat adsorbent sheets 310 are separated by spacers 311 to define flow channels 312 between first end 5 and second end 6. Sheets 310 are on edges 320 to fit the trapezoidal shape of adsorbers 3 between partitions 301. In FIG. 11, radial spacers 325 define radially tapered channels 312. Spacers 325 may be printed onto the adsorbent sheets, and may have the structure shown in FIG. 16. Alternative spacer geometries based on FIGS. 17 or 21 to 23 may also be adapted by tapering to the radial flow pattern required by the trapezoidal shape. FIG. 12 shows an axial section of the radial flow rotor of FIG. 9, with the sector adsorber of FIG. 10 and showing the adsorbent sheets installed between pressure containment walls 330 and 331.

FIG. 13

Figure 13:
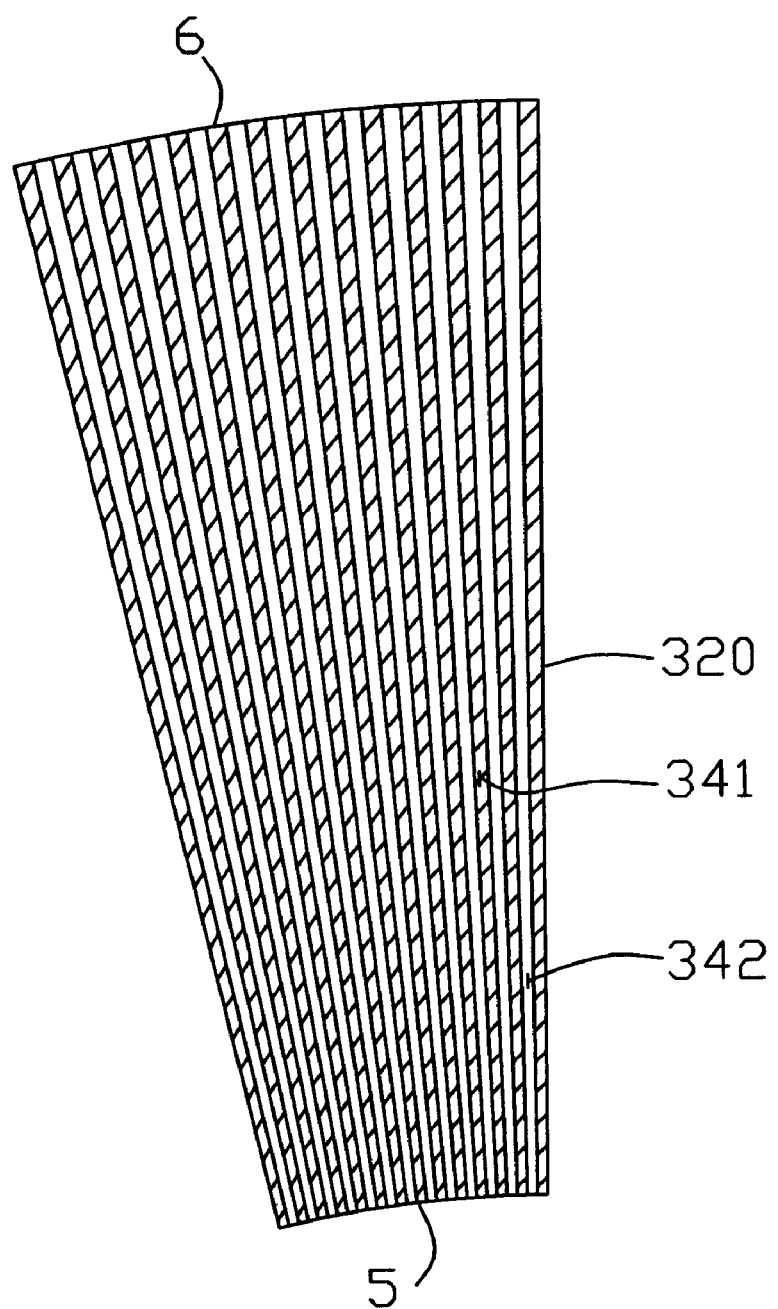
FIG. 13 shows an alternative laminated sector adsorber for the rotor of FIG. 9, with the adsorbent sheets parallel to the axis of the rotor.

FIG. 13 shows an alternative laminated sector adsorber for the rotor of FIG. 9, with the adsorbent sheets in radial planes parallel to the axis of the rotor. Rectangular adsorbent sheets 341 and/or the spacers defining channels 342 are tapered so that the combination of an adsorbent sheet and the adjacent channel has a constant angular width.

Figure 14:
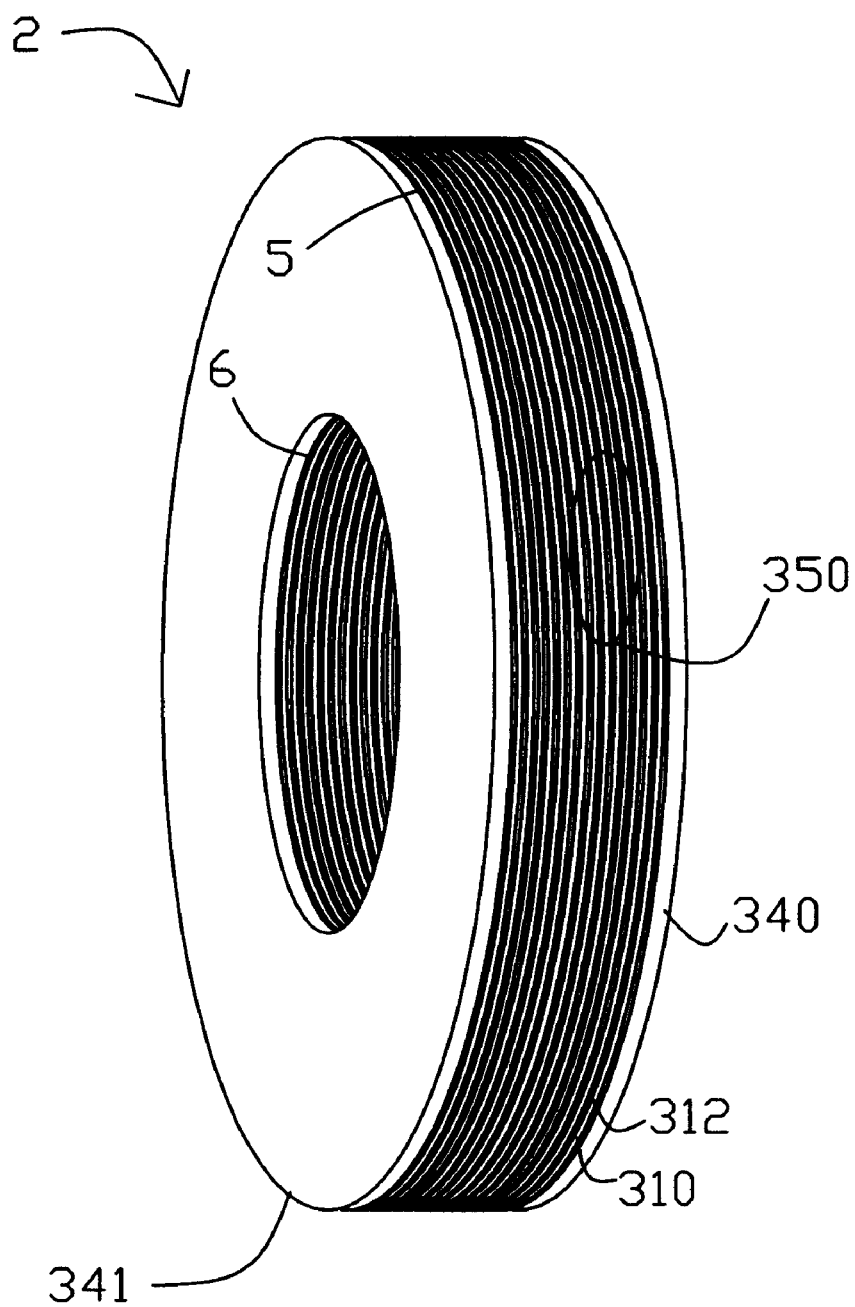
FIGS. 14 and 15 show an alternative radial flow adsorber wheel configuration, with the adsorbent sheets provided as annular discs.
Figure 15:
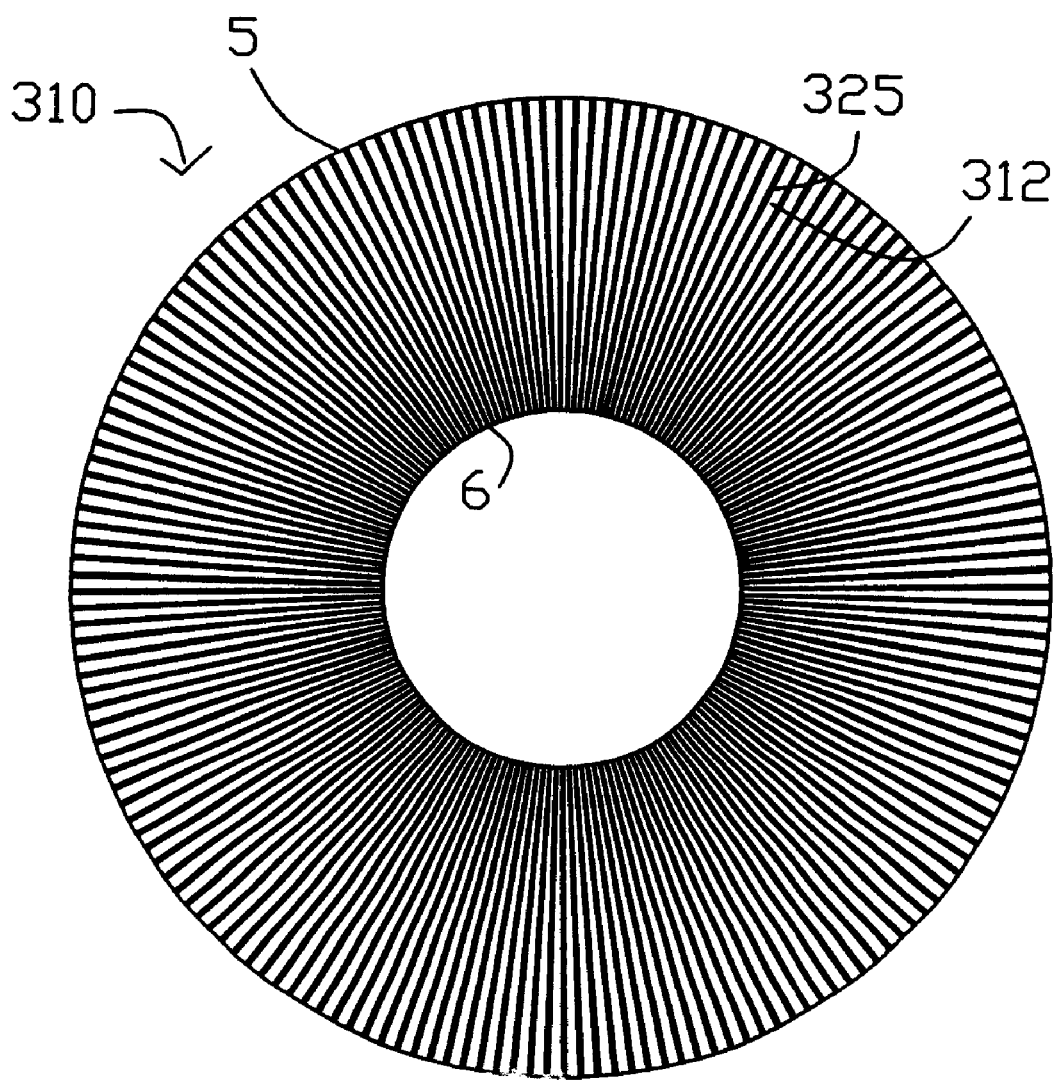

FIGS. 14 and 15

FIGS. 14 and 15 show an alternative radial flow adsorber wheel configuration, with the adsorbent sheets provided as complete annular discs and installed between pressure containment walls 340. As in FIG. 11, radial spacers 325 define flow channels 312. The spacers of FIG. 15 substantially prevent transverse flow between adjacent channels, which thus each define very narrow adsorbers.

Figure 16:
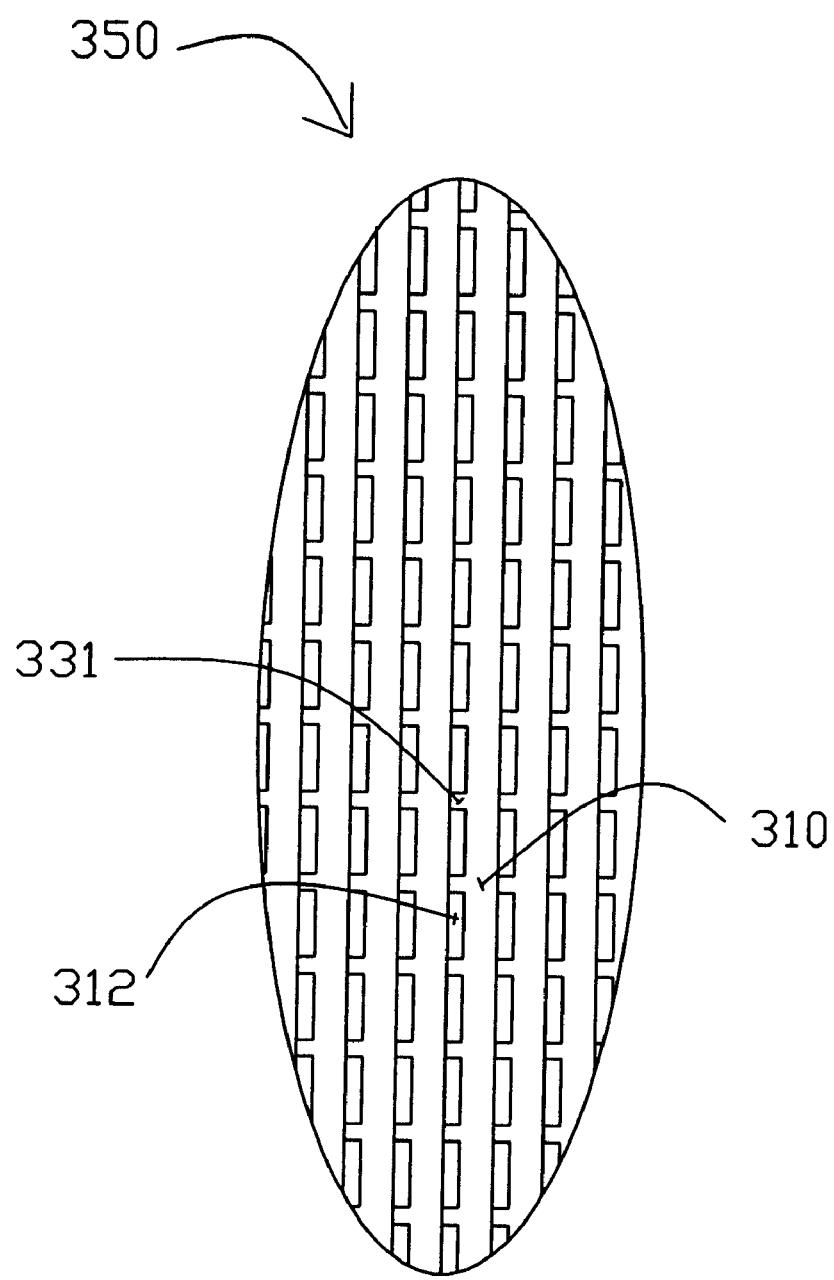
FIGS. 16 and 17 show details of adsorbent laminate spacer configurations.
Figure 17:
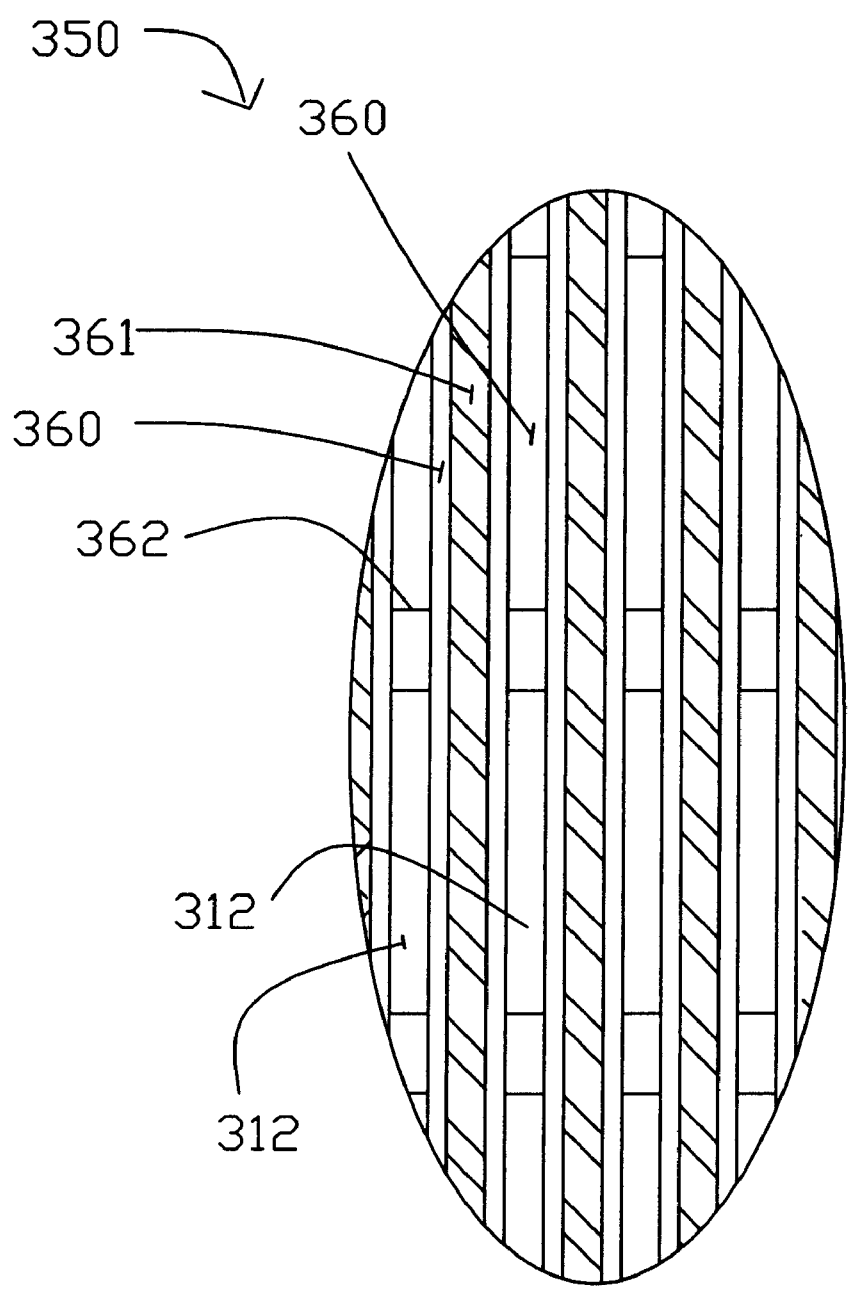

FIGS. 16 and 17

FIGS. 16 and 17 show details of adsorbent laminate spacer configurations from zone 350 of FIG. 14. In FIG. 16, spacer ridges 331 are formed by calendering or by printing one of both sides of adsorbent sheets 310. Preferably, spacers 331 are aligned between adjacent sheets so as to provide compressive strength and stability.

In FIG. 17, the adsorbent is applied as coating layers 360 to both sides of a support aluminum foil 361 whose surface has been anodized for good adhesion. Spacers 362 are printed or embossed on the coated foil.

FIG. 18

Figure 18:
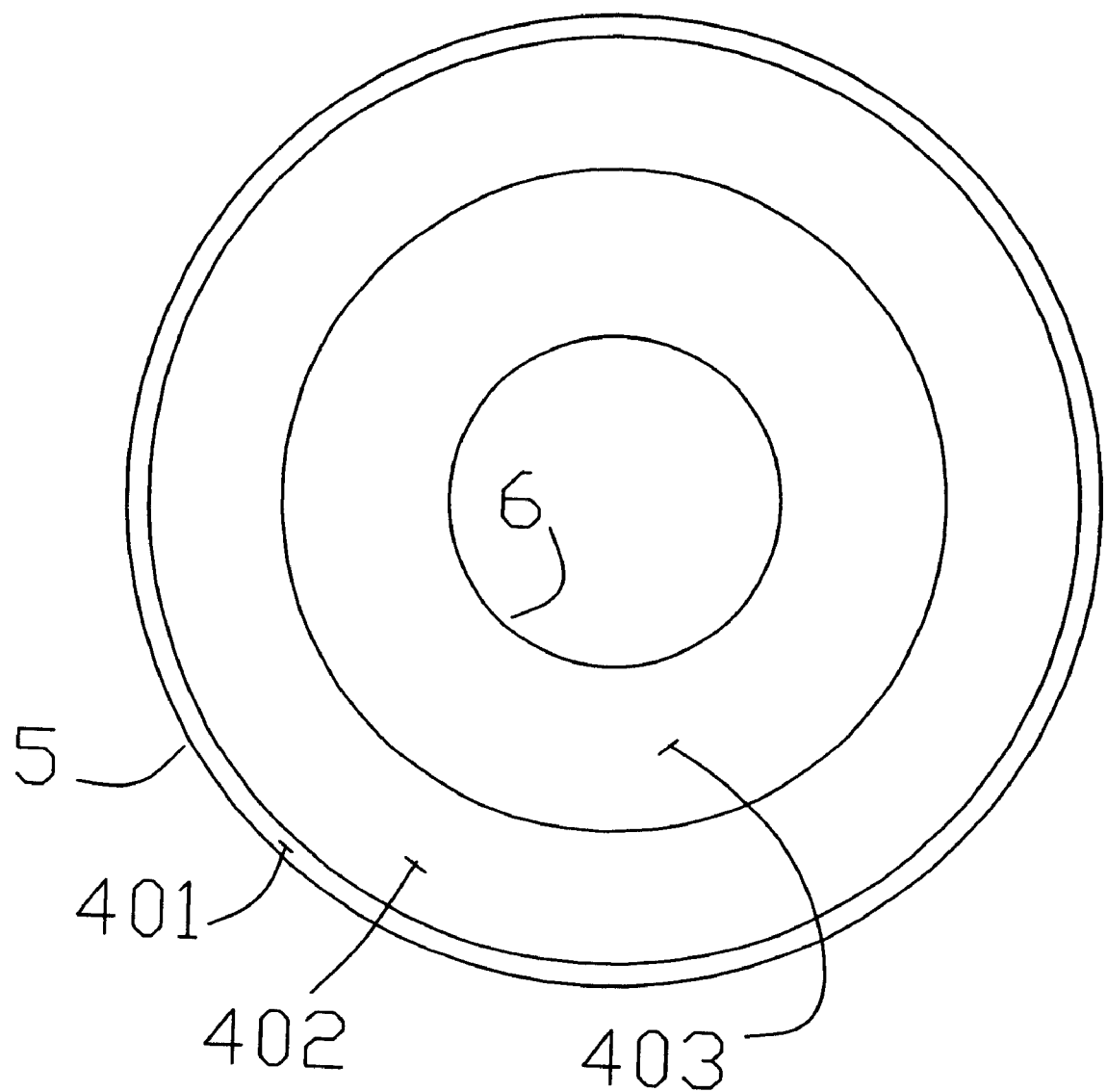
FIG. 18 shows layering of the adsorbents selected between the first and second ends of the adsorbers.

FIG. 18 shows layering of the adsorbents selected between the first and second ends of the adsorbers in a radial flow configuration. Similar axial layering may be applied to axial flow embodiments of the invention. From first end 5 to second end 6 of the adsorbers, the flow path passes through first zone 401, second zone 402 and third zone 403 of the adsorbent. The first zone adsorbent may be alumina gel, silica gel or 13-X zeolite for water vapour removal.

For air separation, the second zone adsorbent may be highly lithium exchanged low silica X zeolite for most efficient bulk nitrogen removal. The third zone adsorbent may advantageously be magnesium, calcium or strontium exchanged chabazite or low silica zeolite X or zeolite A, for most efficient removal of nitrogen from lower concentrations.

For hydrogen separation from syngas, the second zone adsorbent may be 13-X zeolite for efficient bulk carbon dioxide removal. The third zone adsorbent may advantageously be calcium or strontium exchanged chabazite or low silica X zeolite, for efficient removal of carbon monoxide and any nitrogen.

The zones of different adsorbent composition between the first and second ends of the adsorbent elements may be provided by coating the adsorbent sheets in bands of different composition prior to assembly of the elements, or by assembling the elements from separate sheets of the respective compositions so that the gas flowing along the flow path encounters different sheets coated with the respective composition between the first and second ends.

Figure 19:
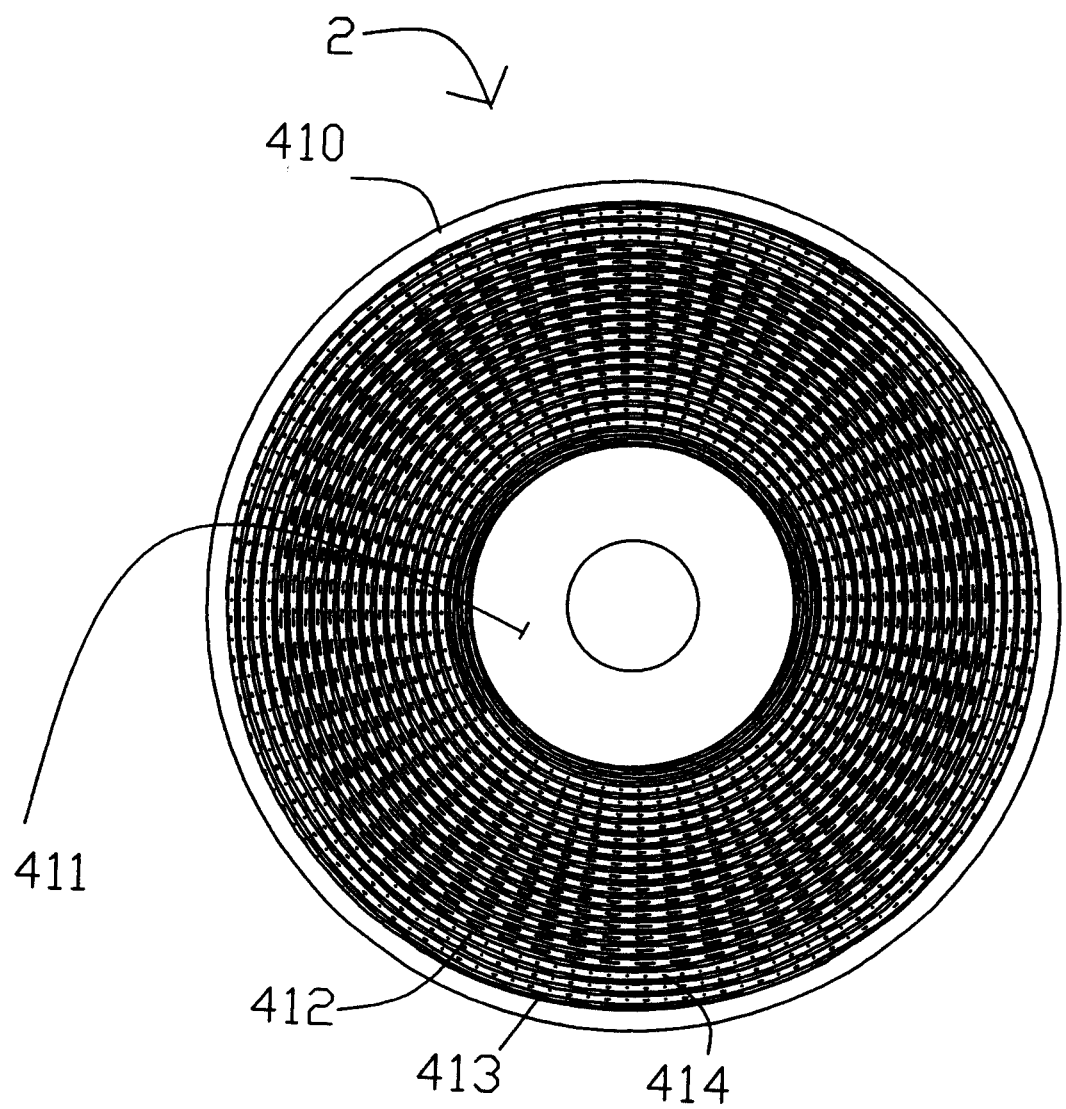
FIGS. 19 and 20 show alternative spiral wrapped axial flow laminate adsorbers.
Figure 20:
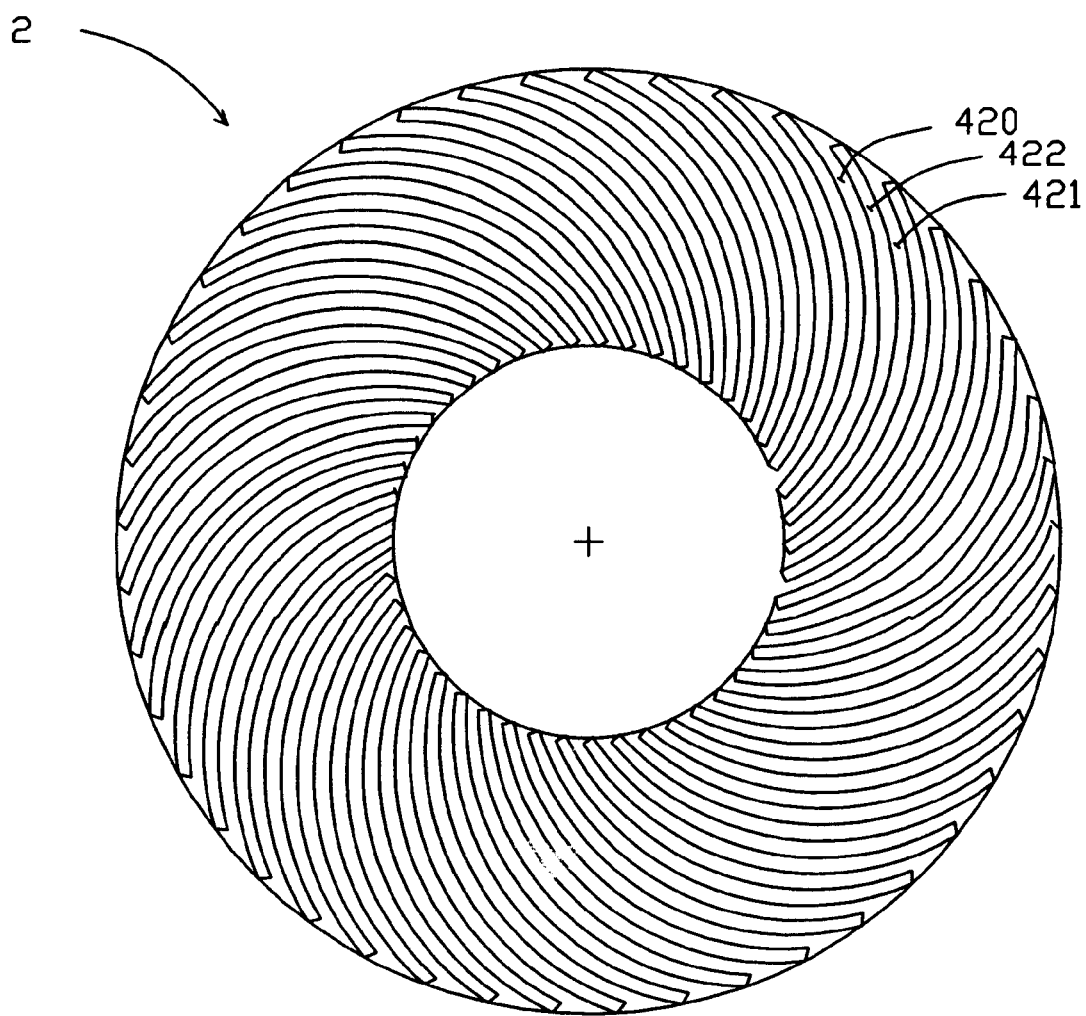

FIGS. 19 and 20

FIGS. 19 and 20 show alternative spiral wrapped axial flow laminate adsorber modules. The FIG. 19 configuration of a spiral wound adsorber wheel with one or a few laminate sheets rolled around hub 411 is suitable for axial flow only. The FIG. 20 configuration of a steep spiral roll of a very large number of adsorbent sheet leaves may in principle be used for either axial or radial embodiments. Each of these geometries may use ribbed spacers such as the spacers 331 of FIG. 16 to isolate the flow channels against transverse flow, so that each flow channel may be an independent adsorber from a neighbouring flow channel ported separately to the first and second valve faces.

The spiral adsorber module of FIG. 19 is contained within cylindrical pressure shell 410, and is rolled around central core 411. Adjacent adsorbent sheet layers 412 and 413 of the spiral roll are separated by spacers 414 to define the flow channels. In order to define a plurality of distinct adsorbers within the module as angularly spaced sectors of the roll, with these adsorbers to be operated with their respective pressure swing adsorption cycles phased apart according to their relative angular position, some of the spacers must block the channel completely against transverse flow (between adjacent adsorber sectors) through the boundary between those adsorbers. Thus, the channels will be completely filled between radially extending edges 451 and 452 of a boundary zone between adjacent adsorbers, one of which is between edges 452 and 453. FIG. 19 illustrates an embodiment with 16 separate adsorbers occupying equal angular sectors within a single cylindrical vessel 410. This aspect of the invention is usefully applicable without limitation to the case that the vessel 410 is rotating to provide the valving function, and alternatively to the case of a non-rotating vessel 410 containing multiple adsorbers whose pressure swing cycle may be controlled by rotating multiport valves.

The multileaf spiral adsorber module of FIG. 20 has adjacent spirally curved adsorbent sheet layers 420 and 421 of the spiral roll, separated by spacers 422 to define the flow channels.

Figure 21:
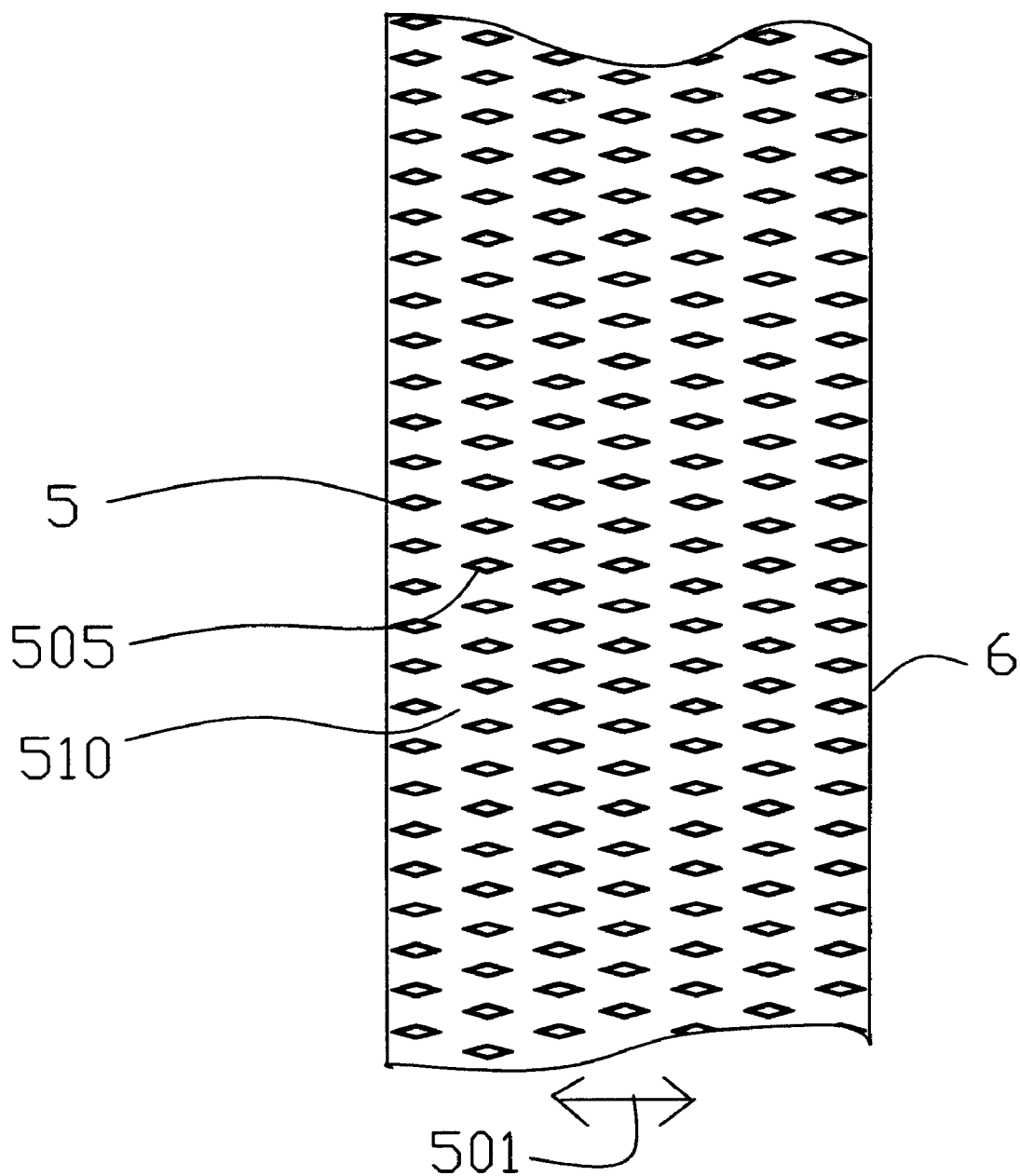
FIGS. 21, 22 and 23 show alternative spacers.
Figure 22:
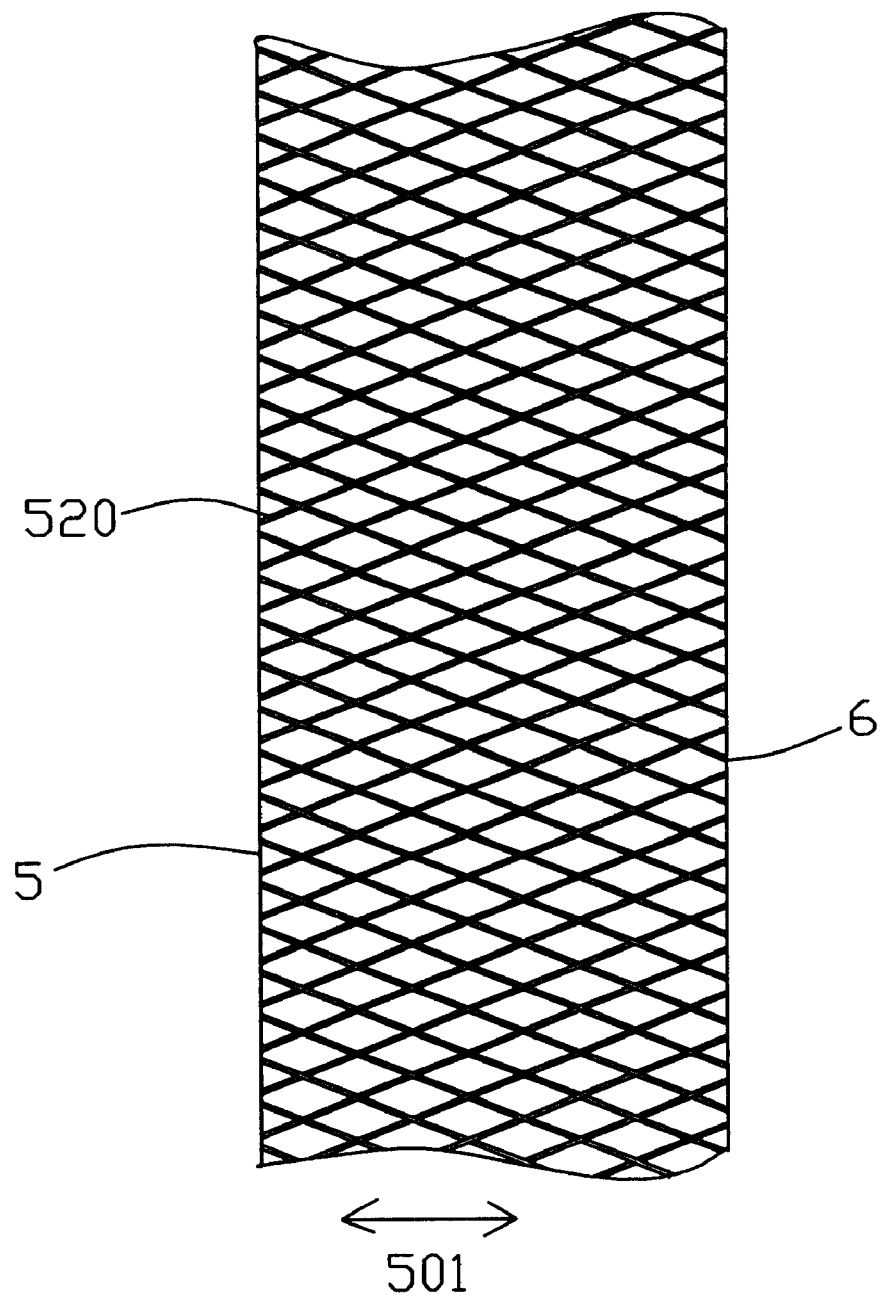
Figure 23:
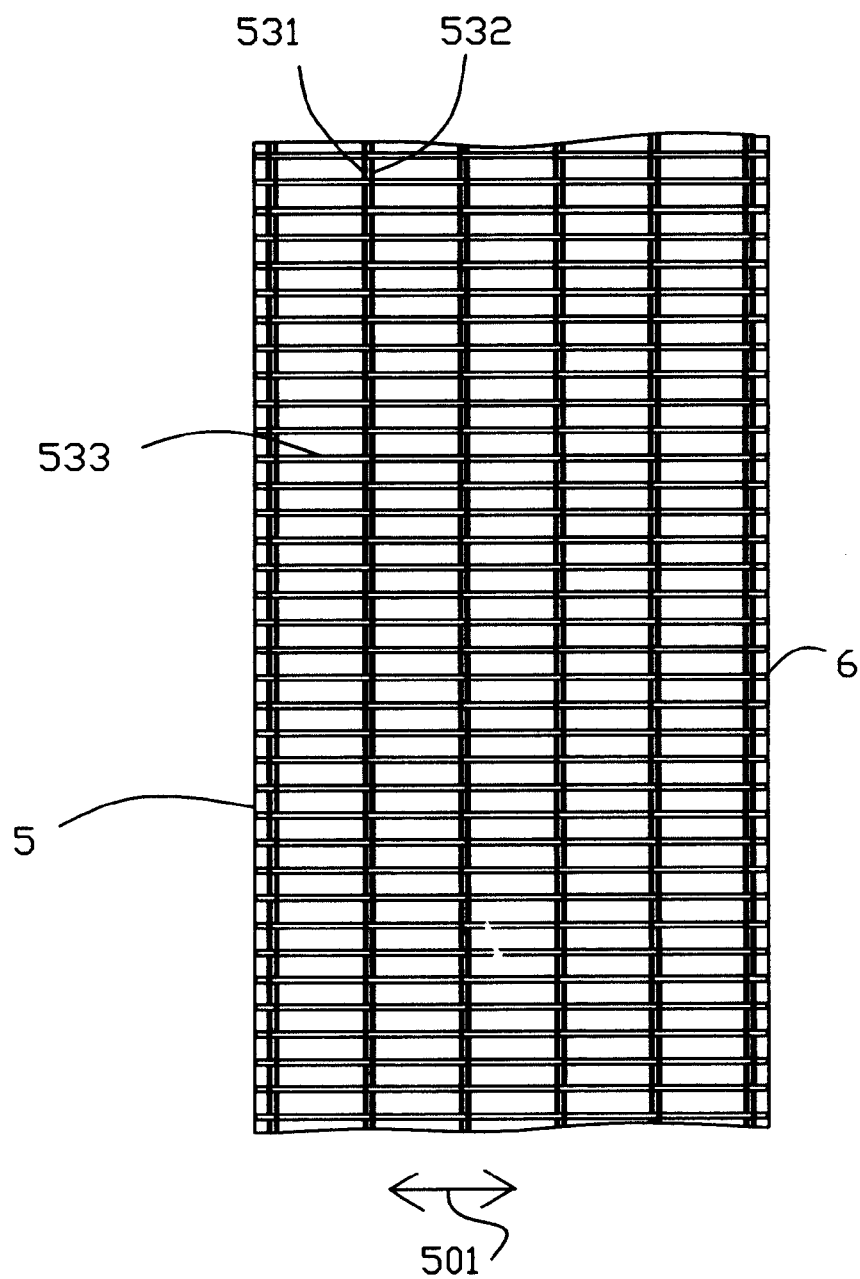

FIGS. 21, 22 and 23

FIGS. 21, 22 and 23 show alternative spacers for use in adsorbers or adsorber sections not requiring compartmentalization against transverse flow, for example the embodiments of FIGS. 7, 8 and 13. The direction of flow is defined by arrow 501. In FIG. 21, raised spacers 505 are applied by printing, to define flow passages 510 between the spacers. In FIGS. 22 and 23, woven spacers of wire screen are used. The mesh of FIG. 22 is a diagonal weave of wires 520. The mesh of FIG. 23 is a Dutch weave, with fine stabilizing wires 531 and 532 criss-crossing heavier longitudinal spacer wires 533 in the flow direction. Some or all of the stabilizing wires may be replaced by polymer fibres which are burnt out during adsorbent activation.

FIG. 24

Figure 24:
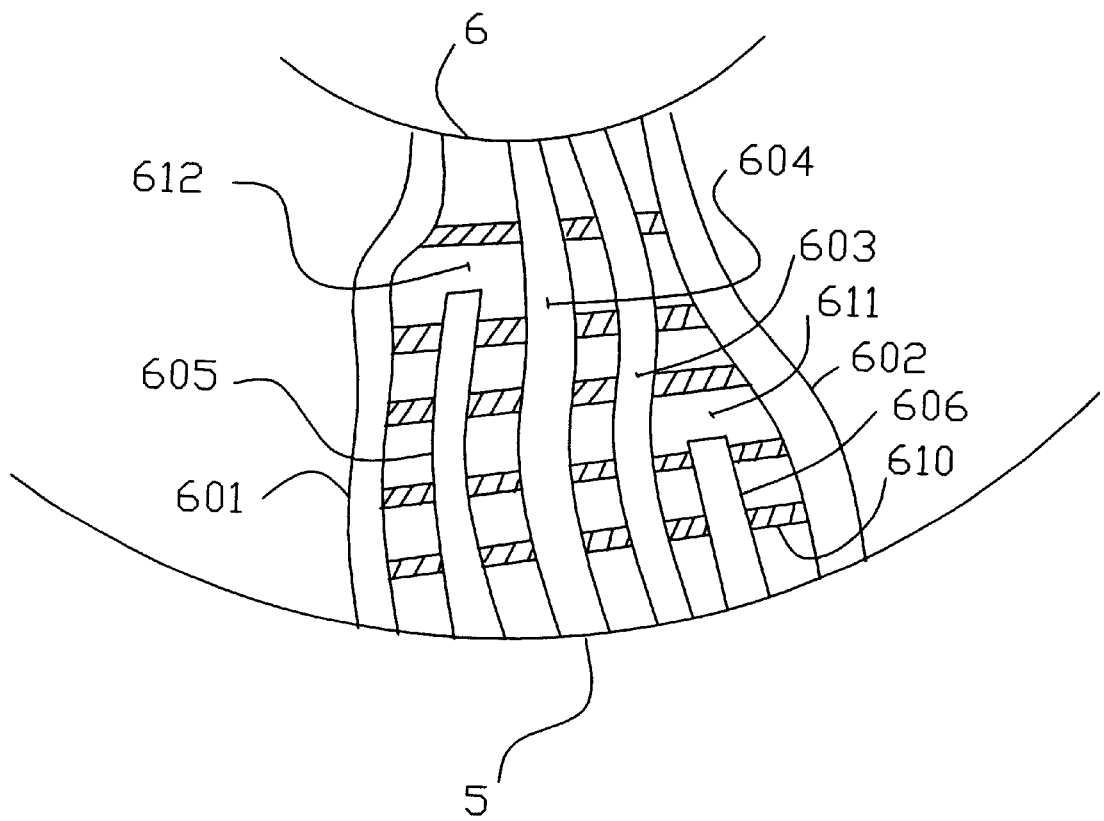
FIG. 24 shows an alternative laminated sector adsorber for the rotor of FIG. 9, with the adsorbent sheets parallel to the axis of the rotor, and with radial tapering provided by interspersing adsorbent sheets of differing width in the radial direction.

FIG. 24 shows an angularly narrow portion of an alternative laminated sector adsorber for the rotor of FIG. 9, with a group of adsorbent sheets parallel to the axis of the rotor, and with radial tapering provided by interspersing adsorbent sheets of differing width in the radial direction. Adsorbent sheets 601, 602, 603, 604, 605 and 606 have printed spacers 610 between adjacent pairs of the sheets, to establish flow channels in the radial direction between first end 5 and second end 6. Spacers 610 are printed in a pattern such as that shown in FIG. 21. While some of the adsorbent sheets (601, 602, 603 and 604) extend the entire radial distance between the first and second ends, others (605 and 606) extend from the first end 5 only varying fractions of the radial distance to the second end 6. Thus, sheet 606 has only approximately a third of the radially extending width, and sheet 605 two thirds of the radially extending width, as the other sheets 601 to 604. Since the stack of adsorbent sheets is thicker at the first end than at the second, it can be tapered by appropriately selecting the fraction of sheets to have reduced radial widths, so as to have an approximately constant angular width between the first and second ends.

Figure 25:
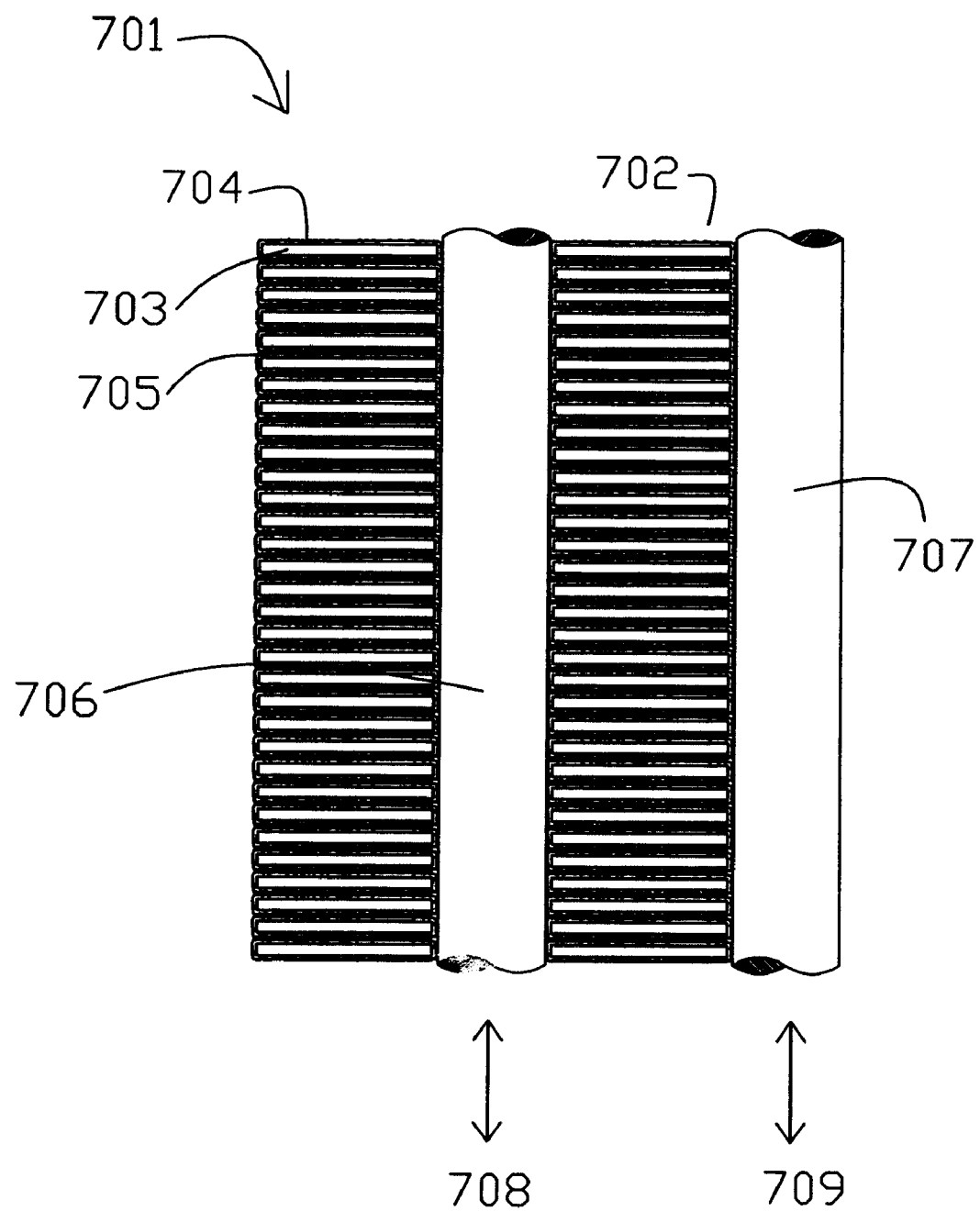
FIG. 25 shows a detail of adsorbent sheets assembled from zeolite-coated strips of aluminum foil, stacked so as to define macropore channels between adjacent strips, the macropore channels being substantially straight and orthogonal to the surface of the adsorbent sheet contacting the main flow channels.

In this embodiment, the sheets are flexible so as to flex around the terminations 611 and 612 of sheets 606 and 605, so as to minimize disturbances of flow distribution and channel pressure resistance adjacent the sheet terminations. FIG. 25

FIG. 25 shows a detail portion of two adjacent adsorbent sheets 701 and 702 assembled from zeolite-coated strips of aluminum foil, stacked so as to define macropore channels between adjacent strips, the macropore channels being substantially rectilinear and orthogonal to the surface of the adsorbent sheet contacting the main flow channels.

An adsorbent sheet (e.g. 100 to 250 microns thick) 701 may be assembled from strips 703 of aluminum foil of approximately 12 microns thickness (equivalent to cigarette wrapper foil). The foil is slit into strips whose width is nominally equal to the final thickness of the sheet. The strips are preferably anodized for good adhesion of zeolite, and are coated on each side with a coating layer 704 or film of zeolite crystals approximately 4 to 6 microns thick. The zeolite crystals may be grown in situ from a zeolite synthesis solution, as with the known art of depositing crystalline zeolite films for membranes, although here there is no concern about avoiding minor crevices or pinholes through the zeolite film. Alternatively, the zeolite coatings may be formed by conversion of a metakaolin coating applied to the foil. Alternatively, the zeolite crystals may be formed separately, and then attached by binders (e.g. clay or silica) to the anodized sheet. The strips are then stacked on each other on contacting faces 705, with their edges in contact with parallel longitudinal support members 706 for sheet 701 and members 707 for sheet 702, orthogonal to the strips so as to form the adsorbent sheets, constituted by the stacked strips being retained by the parallel longitudinal support members to retain the strips and provide structural integrity. The edges of the stacked strips on the longitudinal support members define a wall of the adsorbent material, this wall being the surface of the adsorbent sheet assembled from the strips. The adsorbent sheets are then stacked to form a parallel passage adsorber, with the parallel longitudinal support members serving as spacer members defining flow channels with flow direction indicated by arrows 708 and 709, orthogonal to the strips and between adjacent pairs of adsorbent sheets. Between each pair of adsorbent sheets 701 and 702, the parallel longitudinal support members 706 are separated tranversely so as provide open flow channels, while providing support to the zeolite coated strips 704 constituting each sheet. Because the zeolite crystallites on contacting faces 705 will actually engage only on asperities, these faces 705 also define narrow channels penetrating the wall of adsorbent material, and serving as macropores for diffusional access to the zeolite crystallites from the flow channels. These macropores are substantially rectilinear, and they are orthogonal both to the wall and to the flow direction in the adsorber.

The zeolite crystal coating on the aluminum strips will have a granular surface texture, so that sufficient voidage will exist between the contacting zeolite surfaces of adjacent coated strips to provide adequate macropore voidage and connectivity, with direct fluid access from the flow channels. This voidage between zeolite films of adjacent strips serves as primary macropore channels 705, which are substantially straight with minimal tortuosity, and are orthogonal to the surface of the adsorbent sheets contacting the flow channels.

While only preferred embodiments of the invention have been described herein in detail, the invention is not limited thereby and modifications can be made within the scope of the attached claims.

The Embodiments of the invention in which an exclusive property or privilege is claimed are defined as follows:

1. A rotary module for pressure swing adsorption separation of a gas mixture containing components which are respectively more readily adsorbed and less readily adsorbed under pressure increase over an adsorbent material; the rotary module comprising a stator and a rotor with an axis of rotation, the stator and rotor being mutually engaged in fluid communication across a first rotary valve surface and a second rotary valve surface both centred on the axis of rotation; the stator having a plurality of first function compartments each opening into the first rotary valve surface in an angular sector thereof, and a plurality of second function compartments each opening into the second rotary valve surface in an angular sector thereof; the rotor having a plurality of angularly spaced adsorber elements wherein the adsorbent material is supported in layered adsorbent sheets contacting flow channels defined by spacers between adjacent adsorbent sheets, each such flow channel extending in a flow direction between a first end communicating by a first aperture to the first valve surface and a second end communicating by a second aperture to the second valve surface; and with means to rotate the rotor such that each of the first apertures is opened in fluid communication to the first function compartments by rotation of the rotor bringing the apertures sequentially into the angular sector of each first function compartment, while each of the second apertures is opened in fluid communication to the second function compartments by rotation of the rotor bringing the apertures sequentially into the angular sector of each second function compartment so as to achieve cycling of the pressure in each adsorber element between an upper pressure and a lower pressure.

2. The rotary module of claim 1, further comprising means to provide the gas mixture to one of said first function compartments at the upper pressure, with means to exhaust gas enriched in a more readily adsorbed component from said one first function compartment at the lower pressure, and with means to deliver gas enriched in a less readily adsorbed component from one of said second function compartments at substantially the upper pressure.

3. The rotary module of claim 2, wherein the function compartments also include a plurality of pressurization compartments for subjecting the adsorber elements to a plurality of incremental pressure increases between the upper and lower pressures.

4. The rotary module of claim 3, wherein the pressurization compartments include feed pressurization compartments opening into the first rotary valve surface for delivering the gas mixture to the adsorber elements at incrementally different pressures intermediate between the upper and lower pressures.

5. The rotary module of claim 3, wherein the pressurization compartments include light reflux return compartments opening into the second rotary valve surface for delivering gas enriched in the less readily adsorbed component to the adsorber elements at a plurality of incrementally different pressures.

6. The rotary module of claim 2, wherein the function compartments also include a plurality of blowdown compartments for subjecting the adsorber elements to a plurality of incremental pressure drops between the upper and lower pressures.

7. The rotary module of claim 6, wherein the blowdown compartments include light reflux exit compartments opening into the second stator valve surface for removing gas enriched in the less readily adsorbed component as cocurrent blowdown from the adsorber elements at a plurality of incrementally different pressures.

8. The rotary module of claim 6, wherein the blowdown compartments include countercurrent blowdown compartments opening into the first stator valve surface for removing gas enriched in the more readily adsorbed component from the adsorber elements at a plurality of incrementally different pressures.

9. The rotary module of claim 2, wherein the function compartments are disposed around the respective valve surfaces for conveying gas to and from the adsorber elements in a common predetermined sequence for each adsorber element, the sequence for each adsorber element comprising the steps of (1) supplying the gas mixture at the upper pressure from said one first function compartment as a feed compartment to the adsorber element first end while removing gas enriched in the less readily adsorbed component as a light product gas at substantially the upper pressure from the adsorber element second end to said one second function compartment as a light product compartment, (2) releasing gas enriched in the less readily adsorbed component from the adsorber element second end as light reflux gas so as to reduce the pressure in the adsorber to an intermediate pressure level, (3) releasing gas enriched in the more readily adsorbed component from the adsorber element first end as countercurrent blowdown gas so as to reduce the pressure in the adsorber from an intermediate pressure level, (4) removing gas enriched in the more readily adsorbed component as a heavy product gas at the lower pressure from the adsorber element first end to a first function compartment as a heavy product compartment, and (5) supplying light reflux gas at a pressure intermediate the upper and lower pressure to a light reflux return compartment and thence to the adsorber element second end.

10. The rotary module of claim 9, wherein the sequence also includes after step (5) a step (6) supplying the gas mixture at an intermediate pressure less than the upper pressure to a feed pressurization compartment and thence to the first end of the adsorber element.

11. The rotary module of claim 2 wherein each of the first function compartments have a port in fluid communication with the first rotary valve surface and each of the second function compartments have a port in fluid communication with the second rotary valve surface, and further comprising compression/expansion machinery for maintaining the ports of the first and second function compartments at a plurality of discrete pressure levels between the upper pressure and the lower pressure for maintaining uniform gas flow through the first and second function compartments.

12. The rotary module of claim 11, wherein the function compartments include a plurality of gas feed compartments, and the compression/expansion machinery comprises a multi-stage compressor including a plurality of discharge ports, each said discharge port being coupled to a respective one of the feed compartments for delivering feed gas to the adsorber elements at a plurality of pressure increments.

13. The rotary module of claim 12, wherein the multi-stage compressor comprises a centrifugal compressor having a plurality of stages, at least some of which stages include a discharge port intermediate the stages and coupled to a respective one of the feed compartments.

14. The rotary module of claim 12, wherein the function compartments include a plurality of blowdown compartments, and the compression/expansion machinery includes a multi-stage vacuum pump coupled to the compressor, the vacuum pump including a plurality of inlet ports, each said inlet port being coupled to a respective one of the blowdown compartments for receiving blowdown gas from the adsorber elements at a plurality of pressure increments.

15. The rotary module of claim 12, wherein the function compartments include a plurality of blowdown compartments, and including a plurality of throttle orifices coupled to the blowdown compartments for releasing blowdown gas from the adsorber elements at a plurality of pressure increments.

16. The rotary module of claim 11, wherein the function compartments include a plurality of light reflux exit compartments, and the compression/expansion machinery comprises an expander receiving cocurrent blowdown gas from the light reflux exit compartments and returning that gas to light reflux return compartments.

17. The rotary module of claim 16, in which a light product compressor receives and compresses light product gas from the light product compartment, with the compressor powered by the expander.

18. The rotary module of claim 1, wherein each function compartment is shaped to provide uniform gas flow through the corresponding sector of the first or second rotary valve surface.

19. The rotary module of claim 1, wherein each of the function compartments simultaneously communicates with apertures to at least two angularly spaced adsorber elements so as to provide substantially uniform gas flow at substantially steady pressure through each of the function compartments.

20. The rotary module of claim 1, wherein dead volume associated with the first and second apertures is substantially zero.

21. The rotary module of claim 1, wherein each adsorber element includes a laminated sheet adsorber.

22. The rotary module of claim 1 further comprising fluid sealing means cooperating with the stator to limit fluid leakage between function compartments in each of the first and second rotary valve surfaces, and to counteract fluid leakage from or into each of the first and second rotary valve surfaces.

23. The rotary module of claim 1, wherein the rotor has a first rotor face for engaging with fluid sealing means provided in the first rotary valve surface and a second rotor face for engaging with fluid sealing means in provided the second rotary valve surface, the first rotor face being penetrated by the first apertures and the second rotor face being penetrated by the second apertures, for cyclically exposing each adsorber element to a plurality of discrete pressure levels between the upper and lower pressures.

24. The rotary module of claim 23, wherein each adsorber element is formed from a plurality of adsorbent sheets, each said sheet including a reinforcement material, an adsorbent material deposited therein, a binder for securing the adsorbent material, and a spacer provided between each adjacent pair of adsorbent sheets for providing the flow channel therebetween.

25. The rotary module of claim 24, wherein the reinforcement material is selected from a mineral or glass fiber matrix, a metal wire matrix, or a metal foil.

26. The rotary module of claim 24, wherein the adsorbent material comprises zeolite crystallites.

27. The rotary module of claim 24, wherein the rotor has an annular volume containing the adsorber elements, with the flow direction being axial with respect to the axis of rotation, and with the first rotor face being a circular annular end surface of the rotor and the second rotor face being a circular annular end surface of the rotor, the first and second rotor faces being substantially normal to the axis of rotation.

28. The rotary module of claim 27, wherein the adsorber elements are formed of flat stacks of adsorbent sheets, with the sheets of each adsorber element substantially radially aligned and parallel to the axis of rotation, and including separators located between the adsorbent elements.

29. The rotary module of claim 27, wherein the adsorber elements are formed of curved stacks of adsorbent sheets, with the sheets of each adsorber element substantially radially and spirally aligned and parallel to the axis of rotation, and the stacks are nested spirally so as to substantially fill the annular volume of the rotor.

30. The rotary module of claim 27, wherein the rotor has a cylindrical core coaxial to the axis of rotation and internal to the annular volume, with at least some of the spacers between the adsorbent sheets being spacer separators substantially impervious to fluid flow transverse to the flow direction and substantially extending the entire length between the first and second ends of the flow channels between the spacer separators and defined thereby, the adsorbent elements being formed by spirally rolling at least one adsorbent sheet with the spacer separators evenly spaced around the cylindrical core as a mandrel to form a spiral roll substantially filling the annular volume, and with each pair of adjacent spacer separators between adjacent adsorbent sheet layers defining a distinct adsorber element.

31. The rotary module of claim 27, wherein the rotor has a cylindrical core coaxial to the axis of rotation and internal to the annular volume, the adsorbent sheets being parallel to the axis of rotation and extending in substantially radial and spirally curved orientation from the core, spacers being provided between each adjacent pair of said adsorbent sheets to define axial flow channels therebetween, with at least some of the spacers between the adsorbent sheets being spacer separators substantially impervious to fluid flow transverse to the flow direction and substantially extending the entire length between the first and second ends of the flow channels between the spacer separators and defined thereby with each adsorber element being defined by the flow channel between each adjacent pair of spacer separators and between an adjacent pair of adsorbent sheets, so that the number of adsorber elements is equal to the number of adsorbent sheets multiplied by the number of flow channels defined by the number of spacer separators between each pair of adsorbent sheets, and the adsorbent sheets being nested spirally on the spacers so as to substantially fill the annular volume of the rotor.

32. The rotary module of claim 31, wherein the adsorbent sheets are parallel to the axis of rotation, substantially radially oriented and spirally curved, the adsorber elements being formed by each adjacent pair of spirally curved adsorbent sheets, the spacers to defining flow channels therebetween, with each adsorber element being defined by the flow channel between an adjacent pair of adsorbent sheets, so that the number of adsorber elements at separate angular spacings is equal to the number of adsorbent sheets, and the adsorber elements are nested spirally so as to substantially fill the annular volume of the rotor.

33. The rotary module of claim 24, wherein the rotor has an annular volume containing the adsorber elements, with the flow direction being substantially radial with respect to the axis of rotation, and with the first rotor face being an external cylindrical surface of the rotor and the second rotor face being an internal cylindrical surface of the rotor.

34. The rotary module of claim 33, wherein the adsorber elements are formed of flat stacks of adsorbent sheets, with the sheets of each adsorber element in planes that are substantially radially aligned and parallel to the axis of rotation, and including separators located between the adsorbent elements.

35. The rotary module of claim 33, wherein the adsorber elements are formed of curved stacks of adsorbent sheets, with the sheets of each adsorber element substantially radially and spirally aligned and parallel to the axis of rotation, and the stacks being nested spirally so as to substantially fill the annular volume of the rotor.

36. The rotary module of claim 33, wherein the adsorber elements are formed of flat stacks of adsorbent sheets, with the sheets of each adsorber element in planes that are substantially radially aligned and normal to the axis of rotation, and with the spacers defining substantially radially aligned flow channels between adjacent sheets.

37. The rotary module of claim 36, wherein the adsorber elements are provided in separate trapezoidal angular sectors with respect to the axis of rotation, and with fluid impermeable partitions between adjacent angular sectors.

38. The rotary module of claim 37, with at least some of the spacers between the adsorbent sheets in the trapezoidal angular sectors being spacer separators substantially impervious to fluid flow transverse to the radial flow direction and substantially extending the entire length between the first and second ends of the flow channels between the spacer separator s and defined thereby, with each pair of adjacent spacer separators between adjacent adsorbent sheet layers defining a distinct adsorber element within the angular sector so as to define a plurality of angularly spaced and distinct adsorber elements therein.

39. The rotary module of claim 37 wherein the adsorber elements are externally assembled, activated and then vacuum packed into aluminum foil so as to prevent deactivation prior to their installation, with the aluminum foil removed from the first and second ends of the adsorbent element prior to commissioning.

40. The rotary module of claim 36, wherein the adsorber sheets are provided as circular annular discs with spacers defining a radial flow direction, and the sheets being stacked concentrically with the axis of rotation with the spacers defining radially aligned flow channels between adjacent sheets, with at least some of the spacers between the adsorbent sheets being spacer separators substantially impervious to fluid flow transverse to the radial flow direction and extending the entire length between the first and second ends of the flow channels between the spacer separators and defined thereby, the adsorbent elements substantially filling the annular volume, and with each pair of adjacent spacer separators between adjacent adsorbent sheet layers defining a distinct adsorber element.

41. The rotary module of claim 36 wherein the adsorber elements are externally assembled, activated and then vacuum packed into aluminum foil so as to prevent deactivation prior to their installation, with the aluminum foil removed from the first and second ends of the adsorbent element prior to commissioning.

42. The rotary module of claim 36, in which the spacers are tapered from a greater height at the first end to a smaller height at the second end of the adsorber elements, so that the angular width of the adsorbent element is constant in the radial direction.

43. The rotary module of claim 36, in which the adsorbent sheets are tapered from a greater thickness at the first end to a smaller thickness at the second end of the adsorber elements, so that the angular width of the adsorbent element is constant in the radial direction.

44. The rotary module of claim 23, wherein the adsorber elements include a pair of opposite ends, and each said aperture is disposed immediately adjacent a respective one of the opposite ends.

45. The rotary module of claim 1, in which the spacers are formed on each adsorbent sheet by printing or calandaring onto the sheet a pattern of parallel ridges extending in the flow direction, so as to define the flow channels between adjacent ridges.

46. The rotary module of claim 1, in which the spacers are formed on each adsorbent sheet by printing or calandaring onto the sheet a staggered pattern of raised bosses, so as to define the flow channels extending in the flow direction between the raised bosses.

47. The rotary module of claim 1, in which the spacers are provided as a woven mesh between adjacent pairs of adsorbents sheets, so as to define the flow channels extending in the flow direction therebetween.

48. The rotary module of claim 1, in which the spacers are provided as longitudinal members extending in the flow direction between adjacent pairs of adsorbent sheets, so as to define the flow channels between the longitudinal members, and with bracing members interconnecting adjacent longitudinal members to as to establish and maintain their spacing, the bracing members being narrower than the channel height so as to counteract excessive obstruction to flow in the flow channels.

49. The rotary module of claim 48, in which the longitudinal members are provided as wires or metal strips, and the bracing members are thinner wires or metal strips woven in a Dutch weave pattern to establish the spacers as a woven mesh.

50. The rotary module of claim 1, wherein the adsorber elements comprises a stack of adsorbent material in the form of layered adsorbent sheets, the spacers being provided as a metal foil between adjacent pairs of adsorbent sheets, with raised folded or embossed ridges or grooves or perforations in the foil so as to define flow channels contacting the adsorbent material on the adjacent adsorbent sheet on each side of the foil and extending in the flow direction.

51. The rotary module of claim 50, in which the metal of the foil is aluminum.

52. The rotary module of claim 50, in which the stack of adsorbent material is terminated by the spacers, and the spacers at the terminating ends of the stack contact adsorbent material only on an inner side, with the spacers at the terminating ends being configured to present the same flow channel volume and flow resistance as for spacers between a pair of adsorbent sheets at intermediate positions within the stack, so that all flow channels are substantially identical in their contact with the adsorbent material and in their hydraulic characteristics.

53. The rotary module of claim 50 in which the adsorbent sheets are formed by coating the adsorbent material on each side of an aluminum foil, except for the adsorbent sheets at terminating ends of an the stack which are coated on one side to be installed as an inner side only, so that all flow channels contact the adsorbent material on both sides, and are thus-substantially identical.

54. An adsorber element for contacting an adsorbent material to a fluid mixture, the adsorber element being formed from layered sheets comprising the adsorbent material and a support material, with spacers between the sheets to establish flow channels in a flow direction parallel to the sheets and between adjacent pairs of sheets, the adsorber element having first and second ends defining a flow path in the flow direction through the adsorber element and along the flow channels established by the spacers.

55. The adsorber element of claim 54, wherein each said sheet comprises the support material with the adsorbent material deposited thereon, and a binder for securing the adsorbent material on the support material.

56. The adsorber element of claim 54, wherein the support material comprises a mineralfiber matrix.

57. The adsorber element of claim 54, wherein the adsorbent material comprises zeolite crystallites.

58. The adsorber element of claim 54, formed as a flat stack of the sheets.

59. The adsorber element of claim 58, in which the sheets and the stack are rectangular.

60. The adsorber element of claim 58, in which the sheets and the stack are trapezoidal, with a wider edge at the first end of the adsorber element than at the second end of the adsorber element, so that the flow channels are tapered from the first end to the second end.

61. The adsorber element of claim 54, formed as a curved stack of the sheets.

62. The adsorber element of claim 54, within an annular volume having a cylindrical core coaxially therewithin, the sheets being parallel to the core and extending in substantially radial and spirally curved orientation from the core, spacers being provided between each adjacent pair of said sheets to define axial flow channels therebetween, and the sheets being nested spirally on the spacers so as to substantially fill the annular volume.

63. The adsorber element of claim 54, in which the sheets are activated before assembly into the element, the element then being vacuum packed into aluminum foil so as to prevent deactivation prior to their installation, with the aluminum foil removed from the first and second ends of the element prior to commissioning.

64. The adsorber element of claim 54, in which the sheets are assembled and, then activated, the element being vacuum packed into aluminum foil so as to prevent deactivation prior to installation, with the aluminum foil removed from the first and second ends of the element prior to commissioning.

65. The adsorber element of claim 54, wherein the sheets are provided as annular discs with spacers defining a radial flow direction, the sheets being stacked concentrically in an annular volume with the spacers and the sheets substantially filling the annular volume.

66. The adsorber element of claim 54, in which the spacers are tapered from a greater height at the first end to a smaller height at the second end of the adsorber element, so that the flow channels are likewise tapered.

67. The adsorber element of claim 54, in which the sheets are tapered from a greater thickness at the first end to a smaller thickness at the second end of the adsorber element.

68. The adsorber element of claim 54, in which the spacers are formed on each sheet by printing or calandaring onto the sheet a pattern of parallel ridges extending in the flow direction, so as to define the flow channels between adjacent ridges.

69. The adsorber element of claim 54, in which the spacers are formed on each sheet by printing or calandaring onto the sheet a staggered pattern of raised bosses, so as to define the flow channels extending in the flow direction between the raised bosses.

70. The adsorber element of claim 54, in which the spacers are provided as a woven mesh between adjacent pairs of said sheets, so as to define the flow channels extending in the flow direction therebetween.

71. The adsorber element of claim 54, in which the spacers are provided as longitudinal members extending in the flow direction between adjacent pairs of said sheets, so as to define the flow channels between the longitudinal members, and with bracing members interconnecting adjacent longitudinal members so as to establish and maintain their spacing, the bracing members being narrower than the height of the flow channels so as to counteract excessive obstruction to flow in the flow channels.

72. The adsorber element of claim 71, in which the longitudinal members are provided as wires or metal strips, and the bracing members are thinner wires or metal strips woven in a Dutch weave pattern to establish the spacers as a woven mesh.

73. The adsorber element of claim 54, in which the spacers are provided as a metal foil between adjacent pairs of said sheets, with raised folded or embossed ridges or grooves or perforations in the foil so as to define flow channels contacting the adsorbent material on the adjacent sheet on each side of the foil and extending in the flow direction.

74. The adsorber element of claim 73, in which the metal of the foil is aluminum.

75. The adsorber element of claim 74, formed as a stack of the adsorbent sheets, the stack being terminated by the spacers, and the spacers at the terminating ends of the stack contacting adsorbent material only on the their inner sides, with the spacers at the terminating ends being configured to present the same flow channel volume and flow resistance as for spacers between a pair of adsorbent sheets at intermediate positions within the stack, so that all flow channels are substantially identical in their contact with the adsorbent material and in their hydraulic characteristics.

76. The adsorber element of claim 54, in which the sheets are formed by coating the adsorbent material on each side of an aluminum foil, except for the sheets at the terminating ends of the adsorber element which are coated on one side to be installed as the inner side only, whereby the flow channels contact the adsorbent material on both sides, and are substantially identical.

77. The adsorber element of claim 54, in which the adsorbent material has macropores including macropore channels substantially perpendicular to the surfaces of the sheets contacting the flow channels and substantially rectilinear.

78. The adsorber element of claim 77, in which the macropore channels penetrate the sheets for access from both sides of the sheets.

79. The adsorber element of claim 54, in which the composition of the adsorbent material is selected to be different in each of multiple zones along the flow channel between the first and second ends.

80. The adsorber element of claim 79, applied to air separation, and with at least two zones, a zone closer to the first end having low silica X zeolite exchanged with lithium ions, and a zone closer to the second end having a zeolite selected from the group of magnesium, calcium or strontium exchanged chabazite or low silica zeolite X or zeolite A or mordenite, for efficient removal of nitrogen from lower concentrations.

81. The adsorber element of claim 80, also having a zone adjacent the first end having an adsorbent selected from the group consisting of alumina gel, silica gel, and 13-X.

82. The adsorber element of claim 54, wherein the support material comprises a glass fiber matrix.

83. The adsorber element of claim 54, wherein the support material comprises a metal wire matrix.

84. The adsorber element of claim 54, wherein the support material comprises a metal foil.

85. A rotary module for pressure swing adsorption separation of a gas mixture containing components which are respectiviely more readily adsorbed and less readily adsorbed under pressure increase over an adsorbent material; the rotary module comprising a stator and a rotor with an axis of rotation, the stator and rotor being mutually engaged in fluid communication across a first rotary valve surface and a second rotary valve surface both centred on the axis of rotation; the stator having a plurality of first function compartments each opening into the first rotary valve surface in an angular sector thereof, and a plurality of second function compartments each opening into the second rotary valve surface in an angular sector thereof; the rotor having a plurality of angularly spaced adsorber elements each having an angular width, and with the adsorbent material supported on the walls of parallel flow channels in the adsorber elements, each such flow channel extending in a flow direction between a first end communicating by a first aperture to the first valve surface and a second end communicating by a second aperture to the second valve surface; and with means to rotate the rotor such that each of the first apertures is opened in fluid communication to the first function compartments by rotation of the rotor bringing the apertures sequentially into the angular sector of each first function compartment, while each of the second apertures is opened in fluid communication to the second function compartments by rotation of the rotor bringing the apertures sequentially into the angular sector of each second function compartment so as to achieve cycling of the pressure in each adsorber element between an upper pressure and a lower pressure; with means to provide the gas mixture to a first function compartment at an upper pressure, with means to exhaust gas enriched in a more readily adsorbed component from a first function compartment at a lower pressure, and with means to deliver gas enriched in a less readily adsorbed component from a second function compartment at substantially the upper pressure; and the rotary module further characterized in that the function compartments also include a plurality of pressurization compartments and blowdown compartments for respectively subjecting the adsorber elements to a plurality of incremental pressure increases and a plurality of incremental pressure decreases between the upper and lower pressures and intermediate pressures therebetween.

86. The rotary module of claim 85, with multiple angularly spaced adsorber elements undergoing each of said incremental pressure increases or decreases, so that the flow and pressure at each of the intermediate pressures is approximately steady.

87. The rotary module of claim 85, in which the adsorbent material is supported on adsorbent sheets, and the parallel flow channels are defined by spacers between adjacent adsorbent sheets, with the surfaces of the adsorbent sheets being walls of the flow channels.

88. The rotary module according to claim 85, wherein the flow channels are substantially identical to each other.

89. An adsorbent structure suitable for use in a pressure swing apparatus, comprising:

at least one fluid flow channel;

at least one wall defining said flow channel, said wall comprising a plurality of layered sheets of adsorbent material transverse to the flow channel, and wherein the sheets are spaced to define macropore channels between adjacent sheets, which macropore channels are substantially perpendicular to said flow channel.

90. The adsorbent structure of claim 89, wherein the macropore flow channels are substantially rectilinear.

91. The adsorbent structure of claim 89, wherein the sheets are substantially parallel.

92. The adsorbent structure according to claim 89, wherein the sheets comprise a support material to which a layer of the adsorbent material is applied.

* * * * *